United States Patent
Tang et al.

(10) Patent No.: US 12,379,888 B2
(45) Date of Patent: Aug. 5, 2025

(54) MULTI-SCREEN DATA PROCESSING METHOD, ELECTRONIC DEVICE, AND READABLE STORAGE MEDIUM

(71) Applicant: HONOR DEVICE CO., LTD., Shenzhen (CN)

(72) Inventors: Jiehua Tang, Shenzhen (CN); Peng Wang, Shenzhen (CN); Jian Bai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/700,025

(22) PCT Filed: Apr. 21, 2023

(86) PCT No.: PCT/CN2023/089848
§ 371 (c)(1),
(2) Date: Apr. 10, 2024

(87) PCT Pub. No.: WO2023/221734
PCT Pub. Date: Nov. 23, 2023

(65) Prior Publication Data
US 2024/0338162 A1    Oct. 10, 2024

(30) Foreign Application Priority Data
May 17, 2022   (CN) .......................... 202210541071.7

(51) Int. Cl.
*G06F 3/14* (2006.01)
*G06F 13/42* (2006.01)

(52) U.S. Cl.
CPC ........ *G06F 3/1431* (2013.01); *G06F 13/4282* (2013.01)

(58) Field of Classification Search
CPC ...... G06F 3/1431; G06F 13/4282; G09G 3/36
See application file for complete search history.

(56) References Cited

U.S. PATENT DOCUMENTS

2013/0271354 A1    10/2013   Kondagunturi et al.
2018/0218702 A1    8/2018    Xiong
(Continued)

FOREIGN PATENT DOCUMENTS

CN    207939643 U    10/2018
CN    110531946 A    12/2019
(Continued)

*Primary Examiner* — Abdul-Samad A Adediran
(74) *Attorney, Agent, or Firm* — WOMBLE BOND DICKINSON (US) LLP

(57) ABSTRACT

This application provides a multi-screen data processing method, an electronic device, and readable storage medium, and belongs to the field of electronic device technologies. The electronic device includes: a control chip including a first display serial interface DSI and a second display serial interface DSI, where the first DSI and the second DSI are connected with input ports of a display chip respectively and are configured to provide a first data signal to the display chip; an output port of the display chip is connected with a first display of a plurality of displays, the control chip is configured to control the display chip to output the first data signal or a second data signal to the first display; and/or the control chip is configured to control the output port of the display chip to output first data or second data to a second display other than the first display.

20 Claims, 9 Drawing Sheets

(56) References Cited

U.S. PATENT DOCUMENTS

| | | |
|---|---|---|
| 2023/0367533 A1 | 11/2023 | Hu et al. |
| 2024/0345790 A1* | 10/2024 | Zhang ..................... G09G 3/36 |

FOREIGN PATENT DOCUMENTS

| | | |
|---|---|---|
| CN | 112004086 A | 11/2020 |
| CN | 213690586 U | 7/2021 |
| CN | 113448382 A | 9/2021 |
| CN | 113835656 A | 12/2021 |
| CN | 113835657 A | 12/2021 |
| CN | 114302092 A | 4/2022 |
| CN | 114327314 A | 4/2022 |
| EP | 3240284 A1 | 11/2017 |

\* cited by examiner

MULTI-SCREEN DATA PROCESSING METHOD, ELECTRONIC DEVICE, AND READABLE STORAGE MEDIUM

CROSS-REFERENCE TO RELATED APPLICATIONS

This application is a National Stage of International Application No. PCT/CN2023/089848, filed on Apr. 21, 2023, which claims priority to Chinese Patent Application No. 202210541071.7, filed on May 17, 2022, both of which are hereby incorporated by reference in their entireties.

TECHNICAL FIELD

The present invention relates to the field of electronic technologies, and in particular, to a multi-screen data processing method, an electronic device, and a readable storage medium.

BACKGROUND

With the continuous development of electronic products, more and more electronic products become popular among consumers. Correspondingly, people have higher requirements for indicators related to high performance and low costs of the electronic products. A display function has become a major indicator. For example, to improve a display effect, an application specific integrated circuit (Application Specific Integrated Circuit, ASIC) is added, which may also be referred to as a post-processing discrete graphics card. The ASIC chip is used for optimization and enhancement of single-screen image data. However, as a quantity of displays increases, current methods can no longer meet people's needs for enhanced multi-screen image data processing.

SUMMARY

In view of this, the present invention provides a multi-screen data processing method, an electronic device, and a computer-readable storage medium, so that one ASIC chip can provide image data processing for a plurality of displays. In this way, costs are low, and user's requirement on a display effect can be met.

Embodiments of this application provide a multi-screen data processing method. This application is described from several aspects below. For implementations and beneficial effects of the several aspects below, mutual reference may be made.

According to a first aspect, the present invention provides an electronic device, including: a control chip, a display chip, a plurality of displays, and a toggle switch. The control chip is connected with the display chip, the toggle switch, and the plurality of displays. The control chip is used to control, with the toggle switch, connection relationships between the display chip and/or an interface of the control chip and a corresponding display of the plurality of displays, so that one control chip can directly provide first data to the plurality of displays, or one display chip can respectively provide second data to the displays connected with the display chip. The second data is image data obtained through processing by the display chip and is different from the first data.

According to the electronic device in this embodiment of this application, when the electronic device has more than two displays, one display chip can correspond to a plurality of displays without increasing a quantity of display chips, so that the plurality of displays of the electronic device can implement an enhanced and optimized visual effect. This meets user's requirement for low costs and an enhanced display effect on a plurality of screens. In this way, user experience is improved.

In an embodiment of the first aspect of this application, the control chip includes a first camera serial interface CSI, a first display serial interface DSI, and a second display serial interface DSI. The control chip receives an output signal from a first output port of the display chip through the CSI, and outputs a signal to the display chip through the first DSI.

A second output port of the display chip outputs a signal to a first display of the plurality of displays.

The toggle switch includes a first toggle switch. The first toggle switch includes an input port connected with the second DSI, a first output port connected with the display chip, and a second output port that outputs a signal to a second display other than the first display.

The control chip controls the first toggle switch to switch between a signal transmission channel for the second DSI and the display chip and a signal transmission channel for the second DSI and the second display. By adding a switch, dual-screen display can be implemented, and each screen can obtain image data obtained through processing by the display chip.

In an embodiment of the first aspect of this application, the second output port of the display chip is directly connected with the first display, and the second output port of the first toggle switch is directly connected with the second display.

In an embodiment of the first aspect of this application, the toggle switch further includes a second toggle switch and a third toggle switch.

The second toggle switch includes an input port connected with the second output port of the display chip, a first output port connected with the third toggle switch, and a second output port connected with the first display, so that the second output port of the display chip outputs a signal to the first display through the second toggle switch.

The third toggle switch includes a first input port connected with a first toggle switch, and a second input port connected with the second toggle switch. An output port of the third toggle switch is connected with the second display. According to this method, direct connection between the display chip and the plurality of screens can be achieved, and processed image data can be directly sent without returning the data to the control chip. This method has more advantages in power consumption, data delay, and system software implementation.

In an embodiment of the first aspect of this application, the first toggle switch, the second toggle switch, and the third toggle switch are independent switches, or are integrated into an integrated switch.

In an embodiment of the first aspect of this application, the toggle switch is integrated in the display chip. The display chip includes a data processing unit, and the data processing unit is configured to implement optimization processing on image data. The control chip includes a first camera serial interface CSI, a first display serial interface DSI, and a second display serial interface DSI.

The toggle switch includes: a fourth toggle switch, a fifth toggle switch, a sixth toggle switch, and a seventh toggle switch.

An input port of the fourth toggle switch is connected with the first DSI. A first output port is connected with a first input port of the data processing unit in the display chip. A second output port is connected with a first input port of the sixth toggle switch.

A second input port of the sixth toggle switch is connected with a second output port of the data processing unit. An output port of the sixth toggle switch is connected with a third display of the plurality of displays.

An input port of the fifth toggle switch is connected with the second DSI. A first output port is connected with a second input port of the data processing unit. A second output port is connected with a first input port of the seventh toggle switch.

A second input port of the seventh toggle switch is connected with a second output port of the data processing unit. An output port is connected with a fourth display other than the third display.

A third output port of the data processing unit is connected with the CSI of the control chip, and is configured to return data to the control chip.

In the structure herein, the control switches are integrated to the display chip. For a hardware structure, a circuit covers a smaller area and takes up smaller space.

In an embodiment of the first aspect of this application, the control chip includes a first camera serial interface CSI, a first display serial interface DSI, a second display serial interface DSI, and a third display serial interface DSJ. The CSI is connected with the first output port of the display chip. The first DSI and the second DSI are respectively connected with a first input port and a second input port of the display chip. The control chip receives a first output from the display chip through the CSI, and outputs a signal to the display chip through the first DSI and the second DSJ. The toggle switch includes an eighth toggle switch and a ninth toggle switch.

An input port of the eighth toggle switch is connected with the second output port of the display chip. A first output port is connected with a first input port of the ninth toggle switch. A second output port is connected with a fifth display of the plurality of displays.

A second input port of the ninth toggle switch is connected with the third DSJ. An output port is connected with a sixth display other than the fifth display. By increasing DSIs, a quantity of toggle switches can be reduced as much as possible, and the display chip can be directly connected with the plurality of displays while returning data to the control chip is not needed. This reduces power consumption of the control chip.

In an embodiment of the first aspect of this application, an input port of the toggle switch is connected with the display chip, and an output port is connected with the plurality of displays respectively.

According to a second aspect, a multi-screen data processing method is provided. The method is applied to an electronic device. The electronic device includes: a control chip, an application specific integrated circuit display chip, and a plurality of displays. The control chip is connected with the display chip and the plurality of displays. The method includes:

The control chip separately controls connection between the display chip and/or an interface of the control chip and the plurality of displays, so that the control chip directly provides first data to the plurality of displays, or one display chip respectively provides second data to the displays connected with the display chip. The second data is image data obtained through processing by the display chip and is different from the first data.

According to the multi-screen data processing method provided in this embodiment of this application, when an electronic device has more than two displays, one display chip can correspond to a plurality of displays without increasing a quantity of display chips, so that the plurality of displays of the electronic device can implement an enhanced and optimized visual effect. This meets user's requirement for low costs and an enhanced display effect on a plurality of screens. In this way, user experience is improved.

In an embodiment of the second aspect of this application, that the control chip controls connection between the display chip and the plurality of displays, so that one display chip respectively provides second data to the displays connected with the display chip includes:

The control chip receives a first request for image processing from a first display of the plurality of displays, controls the display chip to connect directly with the first display, and sends the first request to the display chip.

The display chip processes image data based on the first request to obtain second data, and sends the second data to the first display.

The control chip receives a second request for image processing from a second display other than the first display, disconnects the display chip from the first display, and connects the display chip with the second display.

The control chip sends the second request to the display chip, and the display chip processes image data based on the second request to obtain second data, and sends the second data to the second display. According to this method, dual-screen display can be implemented, and each screen can obtain image data obtained through processing by the display chip.

In an embodiment of the second aspect of this application, the control chip includes a first camera serial interface CSI, a first display serial interface DSI 1, and a second display serial interface DSI 2. The CSI and the DSI 1 are separately connected with the display chip.

That the control chip receives a first request for image processing from a first display of the plurality of displays, controls the display chip to connect directly with the first display, and sends the first request to the display chip includes:

The control chip receives the first request for image processing from the first display. The control chip controls the DSI 2 to be connected with an input port of the display chip and an output port of the display chip to be connected with the first display, so that the display chip processes image data based on the first request to obtain second data, and sends the second data to the first display. In this way, a display can obtain data obtained through processing by the display chip.

In an embodiment of the second aspect of this application, that the control chip receives a second request for image processing from a second display other than the first display, disconnects the display chip from the first display, and connects the display chip with the second display includes:

The control chip receives the second request for image processing from the second display, disconnects the display chip from the first display, and connects the DSI 2 with the second display.

That the display chip processes image data based on the second request to obtain second data, and sends the second data to the second display includes:

The display chip processes the image data based on the second request to obtain the second data and sends the second data to the control chip, and the control chip sends the second data to the second display. In this way, another display can obtain data obtained through processing by the display chip.

In an embodiment of the second aspect of this application, that the control chip receives a second request for image processing from a second display other than the first display, disconnects the display chip from the first display, and connects the display chip with the second display includes:

The control chip receives the second request for image processing from the second display, disconnects the display chip from the first display, disconnects the DSI 2 from the display chip, and connects the display chip and the DSI 2 with the second display.

In an embodiment of the second aspect of this application, the display chip includes a data processing unit.

That the control chip controls connection between the display chip and the plurality of displays, so that the display chip respectively provides second data to the displays connected with the display chip includes:

The control chip controls the data processing unit to be connected with the plurality of displays respectively, so that the display chip provides the second data to the displays directly connected with the data processing unit.

In an embodiment of the second aspect of this application, the control chip includes a first camera serial interface CSI, a first display serial interface DSI 1, a second display serial interface DSI 2, and a third display serial interface DSI 3, where the CSI, the DSI 1, and the DSI 2 are separately connected with the display chip.

That the control chip receives a first request for image processing from a first display, and controls the display chip to connect directly with the first display includes:

The control chip receives the first request for image processing from the first display, and the control chip controls the display chip to connect directly with the first display and disconnects the DSI 3 from the second display.

In an embodiment of the second aspect of this application, that the control chip receives a second request for image processing from a second display other than the first display, disconnects the display chip from the first display, and connects the display chip with the second display includes:

The control chip receives the second request for image processing from the second display, disconnects the display chip from the first display, disconnects the DSI 3 from the second display, and connects the display chip with the second display.

According to a third aspect, this application provides a computer-readable storage medium. The computer-readable storage medium stores a computer program. When the computer program is run by an electronic device, the electronic device is enabled to perform the method according to the embodiment of the first aspect.

According to a fourth aspect, this application discloses a computer program product including instructions. When the instructions are run on a computer, the computer is enabled to perform the method according to the embodiment of the first aspect.

DESCRIPTION OF EMBODIMENTS

The following clearly describes technical solutions in embodiments of this application with reference to accompanying drawings in embodiments of this application.

For ease of understanding the technical solutions in this application, key terms related to this application are first described below.

A system on chip is also referred to as System-on-Chip, or SoC for short. The SoC is an integrated circuit for a specific purpose, and includes a complete system and entire content of embedded software. The SoC is configured to implement the entire process including determining system functions, software/hardware partitioning, and completing design. In this application, connection relationships between an SoC interface, an ASIC chip, and a plurality of displays are controlled, to achieve separate control over display by a single display, or to achieve cooperation with a display chip and the like to control display. The SoC is used as an instance of a control chip in this application.

An application specific integrated circuit is a display chip used for post-processing, and is referred to as an ASIC chip for short. ASIC is an abbreviation of Application Specific Integrated Circuit. The ASIC chip is an integrated circuit made for a specific user or a specific electronic system. For example, in this application, the ASIC chip is configured to display optimization and enhancement of back-end image data, such as color enhancement, MEMC interpolation, and HDR data processing. The ASIC is used as an instance of a display chip in this application.

The technical solutions of this application are described in the following with reference to scenario diagrams.

Currently, in some special scenarios such as gaming and page browsing, to improve a display effect and user experience, image data of electronic devices need to be optimized and enhanced. For example, color enhancement, motion estimate and motion compensation (motion estimate and motion compensation, MEMC) (that is, MEMC interpolation), high dynamic range (High Dynamic Range, HDR) data processing are performed. In this way, a better visual effect reflecting a real environment can be obtained. In this case, user's visual experience can be improved. Usually, an ASIC chip dedicated to implementation of the special processing needs to be added to an electronic device. In the following embodiments, internal structures are described with reference to specific accompanying drawings.

Figure 1A:
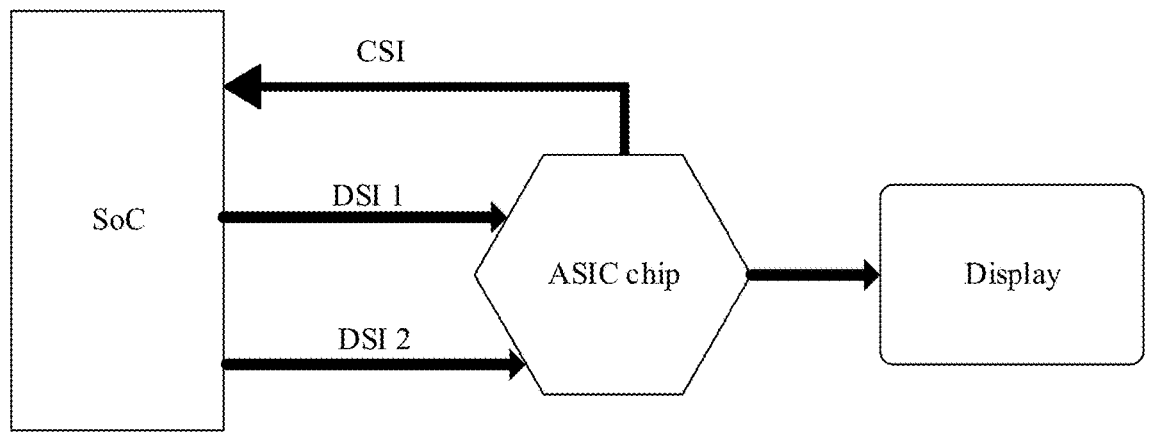
FIG. 1*a* is an example schematic diagram of a structure of an electronic device.

Refer to FIG. 1a. FIG. 1a is a schematic diagram of a structure of an electronic device. As shown in FIG. 1a, the electronic device includes a system on chip "SoC", an ASIC chip connected to the SoC, and a display connected to the ASIC chip. The SoC includes a camera serial interface (Camera Serial Interface, CSI), that is, "CSI", and two display serial interfaces (Display Serial Interface Specification, DSI), namely "DSI 1" and "DSI 2". The SoC connects with the ASIC chip through these interfaces, and sends to-be-processed image data to the ASIC chip through the DSI 1 and the DSI 2. The ASIC chip optimizes and enhances the image data and sends processed image data to the display. Then the display displays an optimized and enhanced image.

However, when there are a plurality of displays, enhanced display of the plurality of displays cannot be achieved since the ASIC chip is only connected to one display.

Figure 1B:
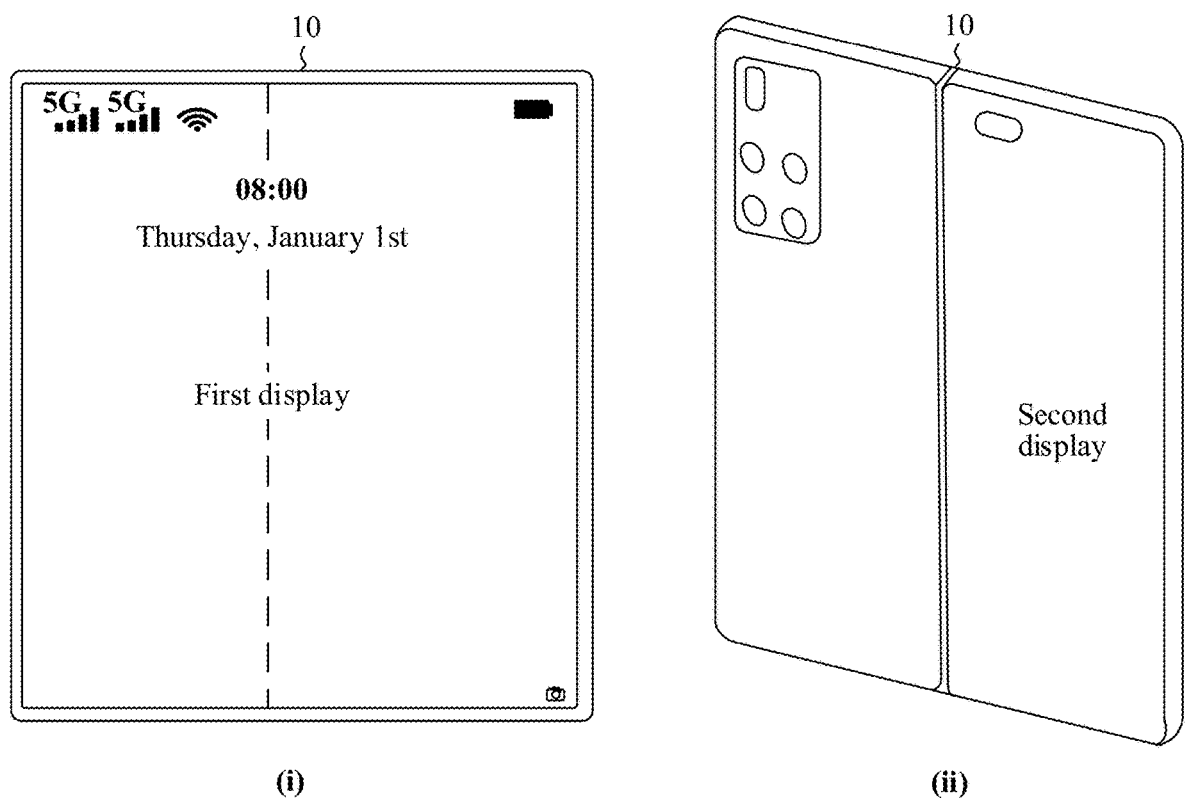
FIG. 1*b* is a schematic diagram of a mobile phone with two screens.

Refer to FIG. 1b. FIG. 1b is a schematic diagram of a structure of a mobile phone with an inner display and an outer display. As shown in (i) in FIG. 1b, a mobile phone 10 has a "first display", which is also referred to as an inner display. As shown in (ii) in FIG. 1b, the mobile phone 10 has a "second display", which is also referred to as an outer display. Based on the structure shown in FIG. 1, because the ASIC chip is only connected to one display, for example, the ASIC chip is connected to the first display, an optimized and enhanced image can only be displayed on the first display while such visual effect cannot be achieved on the second display. Therefore, this connection manner cannot be applied to dual-screen display or multi-screen display, affecting user experience. However, adding a plurality of ASIC chips is costly. As a result, manufacturing costs greatly increase, and therefore, user's requirement for low costs cannot be met.

In this case, to apply one display ASIC chip to two or more screens, this application provides an electronic device. The electronic device includes at least two displays, a system on chip SOC, an application specific integrated circuit ASIC chip, and a toggle switch (switch). Connection manners between the SOC, the ASIC chip, the toggle switch, and the at least two displays may include wired or wireless direct connection or indirect connection through another component. The SOC is used to control, with the toggle switch, one or more of a connection relationship between an SOC interface and the ASIC chip, connection relationships between SOC interfaces and the plurality of displays, and connection relationships between the ASIC chip and the plurality of displays. In this way, when only one ASIC chip is set, by adding one or more toggle switches and modifying data transmission relationships between the SOC, the ASIC chip, and the displays, the one ASIC chip can provide image data obtained through image quality processing to the plurality of displays.

In an embodiment of this application, a function of the toggle switch (switch) may be implemented by hardware or software. This is not specifically limited in this application.

In embodiments of this application, an example in which an electronic device has two screens (displays) is used for description. In some embodiments, there may be a plurality of displays. Features, such as a shape, of the displays are not limited in this application.

In some embodiments of this application, the electronic device may alternatively be a multi-screen electronic device like a mobile phone, a desktop computer, a tablet computer, a notebook computer, an ultra-mobile personal computer, a personal digital assistant (personal digital assistant, PDA), or a wearable electronic device like a watch or a wrist band. A specific form of the electronic device is not limited in this application.

In the following embodiments, a structure of an electronic device and a multi-screen data processing method provided in this application are described with reference to specific embodiments.

The following describes the solutions in this application with reference to a specific structure of an electronic device.

Figure 2:
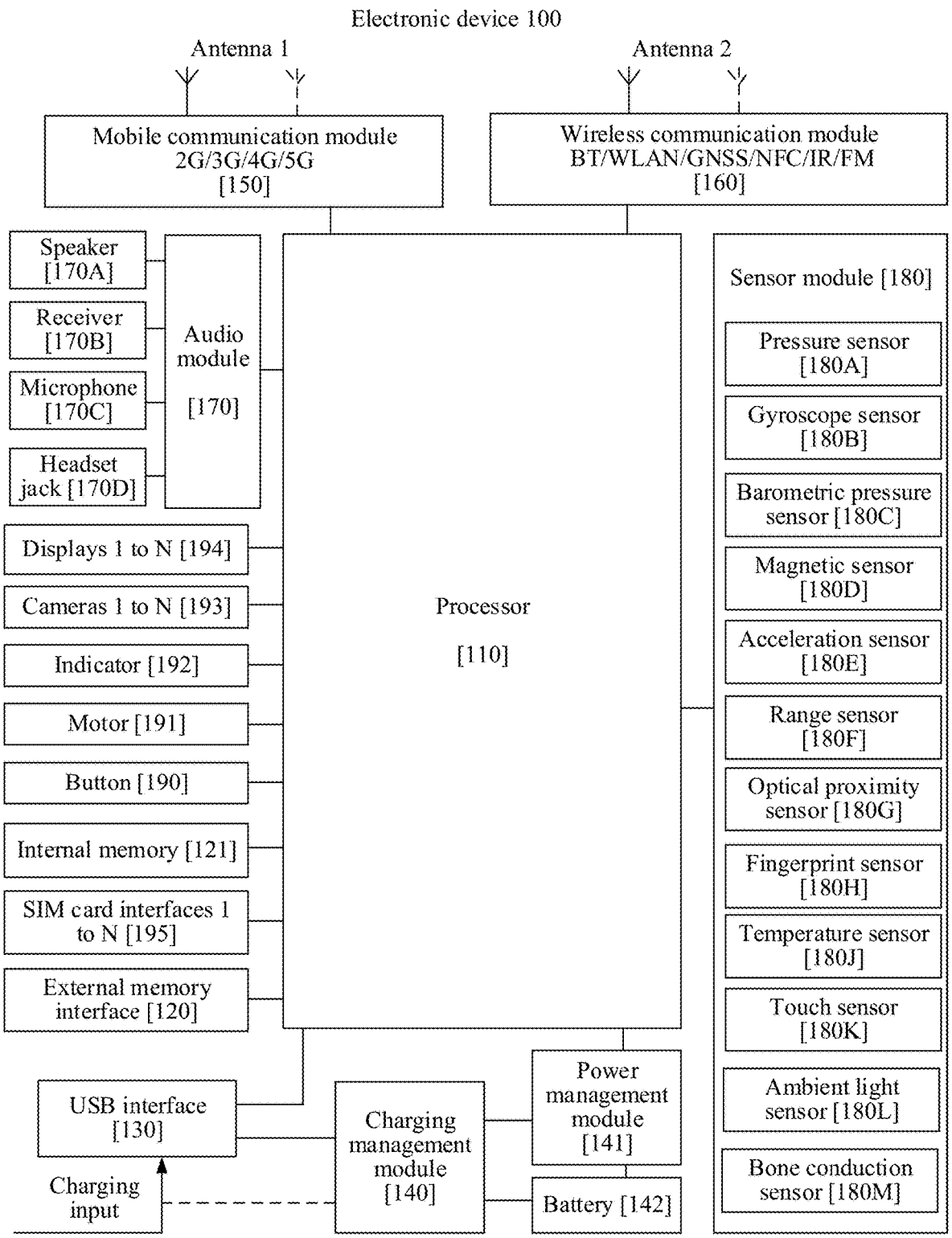
FIG. 2 is a schematic diagram of a structure of an electronic device according to an embodiment of this application.

Refer to FIG. 2. FIG. 2 is a schematic diagram of a structure of an electronic device according to an embodiment of this application. An electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, an ASIC chip 196, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate components, or may be integrated into one or more processors.

The processor 110 may generate an operation control signal according to an instruction operation code and a sequence signal, to complete control of fetching and executing an instruction.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instruction or the data again, the processor may directly invoke the instruction or the data from the memory, repeated access is avoided, and waiting time of the processor 110 is reduced, thereby improving system efficiency.

In an embodiment of this application, the processor 110 controls connection relationships between an SoC interface, an ASIC chip, and a plurality of displays, so that an SoC can provide data to the plurality of displays, and multi-screen display can be implemented, or one ASIC chip provides image data obtained through processing by the ASIC chip to displays separately connected with the ASIC chip, so that one ASIC chip can correspond to a plurality of displays.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and a subscriber identity module (subscriber identity module, SIM) interface.

The MIPI may be configured to connect the processor 110 to a peripheral device like the display 194 or the camera 193. The MIPI includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

In some embodiments, an ASIC chip is set between the processor 110 and the display 194. After receiving an image display request from the display, the processor 110 sends, to the ASIC chip, some image data that need to be optimized and enhanced. The ASIC chip further optimizes and processes the image data, for example, performs color enhancement, MEMC interpolation, and HDR data processing. The ASIC chip then sends processed data to the display sending the request for enhanced display, to achieve a better visual effect.

In some embodiments, the processor 110 may connect the ASIC chip with a plurality of displays with a toggle switch, so that one ASIC chip can provide processed image data to the plurality of displays. This ensures that each display can implement an optimized and enhanced visual effect at low costs. A function of the toggle switch may be implemented by hardware, or may be implemented by software. There may be one toggle switch or a plurality of toggle switches. When the plurality of toggle switches are hardware, the toggle switches may be set independently or may be integrated. A quantity of and a structural form of the toggle switch are not limited in this application.

There may be two or more DSIs in this application. The DSIs may be connected directly with the ASIC chip 196 to ensure that the processor 110 can quickly send image data to the ASIC chip.

In addition, in some embodiments, when there are a plurality of displays, to ensure simultaneous display by the displays, the processor 110 can control, with a toggle switch, some DSIs to connect with the ASIC chip and some DSIs to connect with the displays, so as to achieve simultaneous display by the plurality of displays. In addition, when the ASIC chip is required to connect with another display, the processor 110 may change connection relationships between the DSIs and the ASIC chip and connection relationships between the ASIC chip and the displays, so as to enable the ASIC chip to provide enhanced and optimized image data to the another display.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The electronic device 100 implements a display function by using the GPU, the display 194, the application processor, and the like. The GPU is a micro-processor for image processing and connects the display 194 and the application processor. The GPU is configured to perform mathematical and geometric calculation, and is configured to render graphics. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro-OLED, a quantum dot light emitting diode (quantum dot light emitting diode, QLED), or the like.

In some embodiments, the electronic device 100 may include 1 or N displays 194, where N is a positive integer greater than 1. When a quantity of displays is greater than 1, the processor 110 may control connection relationships between the ASIC chip and the displays with a control switch, to ensure that each display can be connected with the ASIC chip and obtain enhanced and optimized image data. This improves user experience.

The electronic device 100 may implement a photographing function by using the ISP, the camera 193, the video codec, the GPU, the display 194, the application processor, and the like.

The camera 193 is configured to capture a static image or a video. An optical image is generated for an object by using a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format like RGB and YUV. In some embodiments, the electronic device 100 may include 1 or N cameras 193, where N is a positive integer greater than 1.

In some embodiments, the processor 110 connects with the camera 193 through a camera serial interface CSI, and obtains image data collected by the camera 193. After the processor 110 further optimizes and enhances the image data by using the ASIC chip, the ASIC chip displays processed image data on a connected display. In this way, a scene seen by a user on the display is closer to a real scene in front of the camera. The scene is vivid. This improves user experience.

The internal memory 121 may be configured to store computer-executable program code, where the executable program code includes instructions. The internal memory 121 may include a program storage area and a data storage area. The program storage area may store an operating system, an application required by at least one function (like a sound playing function and an image display function), and the like. The data storage area may store data (such as audio data and contacts) and the like created when the electronic device 100 is used. In addition, the internal memory 121 may include a high-speed random access memory, and may also include a non-volatile memory, for example, at least one magnetic disk storage device, a flash memory device, or a universal flash storage (universal flash storage, UFS). The processor 110 runs the instructions stored in the internal memory 121 and/or instructions stored in a memory disposed in the processor, to perform various function applications and data processing of the electronic device 100.

In some embodiments, the internal memory 121 stores logic instructions for controlling a toggle switch. The processor 110 controls connection relationships between the DSIs, the ASIC chip, and the plurality of displays according to the instructions, so that one ASIC chip can correspond to the plurality of displays, and then the plurality of displays of the electronic device can implement a better visual effect.

The touch sensor 180K is also referred to as a "touch device". The touch sensor 180K may be disposed on the display 194. The touch sensor 180K and the display 194 form a touchscreen. The touch sensor 180K is configured to detect a touch operation on or near the touch sensor 180K. The touch sensor may transfer the detected touch operation to the application processor to determine a type of the touch event. The display 194 may provide a visual output related to the touch operation. In some other embodiments, the touch sensor 180K may alternatively be arranged on a surface of the electronic device 100 at a position different from that of the display 194.

In some embodiments, the user can perform operations such as tapping on the display 194. The touch sensor obtains the operations such as tapping, encapsulates the touch event, and sends the touch event to the processor 110. The processor 110 determines a user's request based on the touch event. When data requested by the user includes image data that needs to be enhanced and optimized, the processor 110 sends the image data to the ASIC chip for post-processing, so that enhanced and optimized image data can be displayed on the display tapped by the user.

A software system of the electronic device 100 shown in FIG. 2 may use a layered architecture, an event-driven architecture, a microkernel architecture, a microservice architecture, or a cloud architecture. In this embodiment of the present invention, an Android system with a layered architecture is used as an example to illustrate a software system structure of the electronic device 100.

Figure 3:
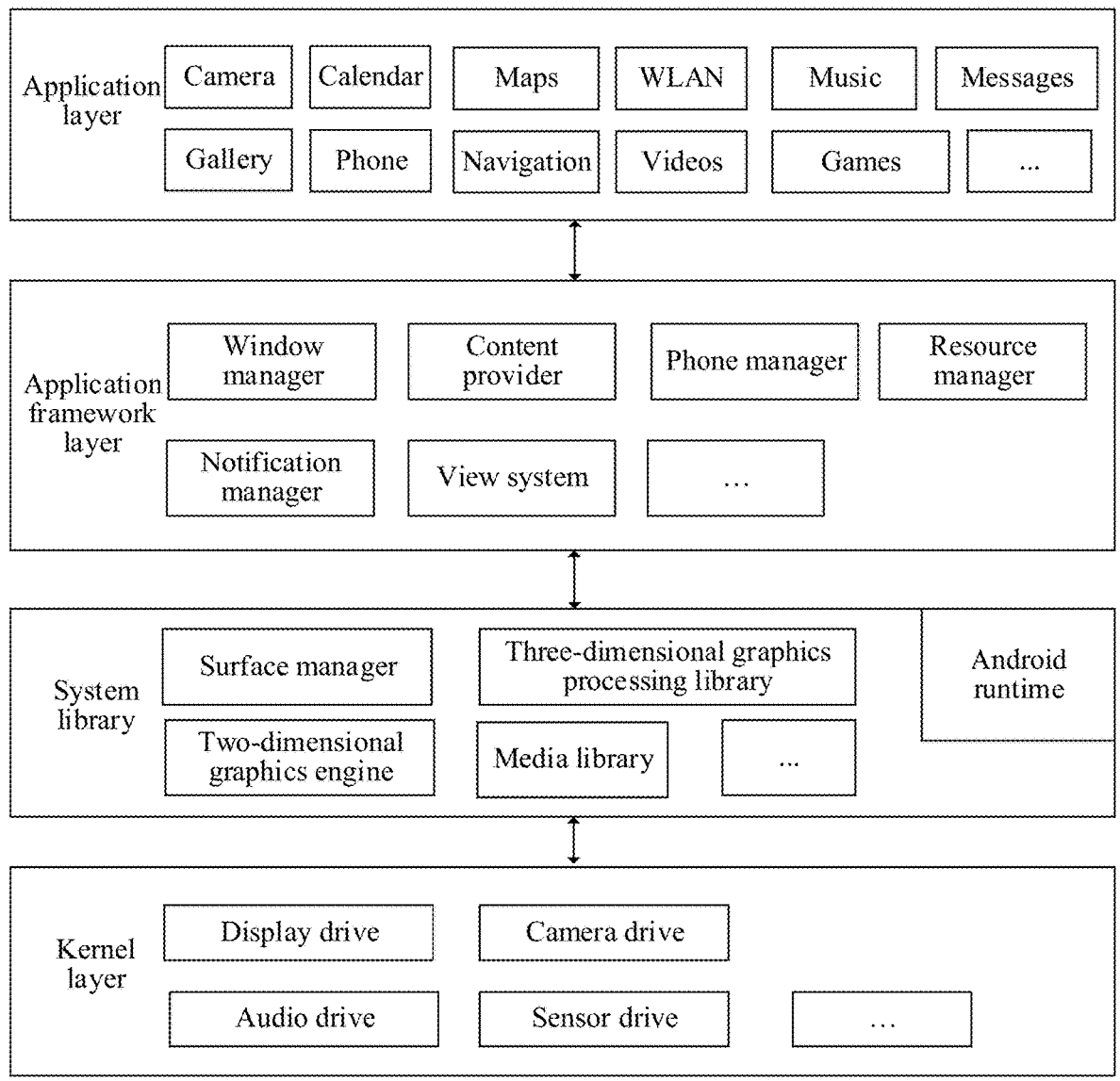
FIG. 3 is a schematic diagram of a software architecture of an electronic device according to an embodiment of this application.

FIG. 3 is a block diagram of a software structure of an electronic device 100 according to an embodiment of the present invention.

As shown in FIG. 3, the software with a layered architecture is divided into several layers, and each layer has a clear role and task. The layers communicate with each other through a software interface. In some embodiments, the Android system is divided into four layers, which are an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Videos, Messages, and Games.

As shown in FIG. 3, the application framework layer may include a window manager, a content provider, a view system, a phone manager, a resource manager, a notification manager, and the like.

The content provider is configured to store and obtain data and make the data accessible to an application. The data may include a video, an image, an audio, calls that are made and answered, a browsing history and bookmarks, contacts, and the like.

In some embodiments, the content provider can store image data processed by the ASIC chip and provide the data to an application like a game application in the application layer.

The kernel layer is a layer between hardware and software. The kernel layer includes at least a display drive, a camera drive, an audio drive, and a sensor drive.

The following specifically describes a structure of an electronic device and a multi-screen data processing method provided in this application with reference to specific embodiments.

In the following embodiments, a mobile phone (used as an example of the electronic device) is used an example for description. The mobile phone has a plurality of screens. In the following embodiments, a dual-screen mobile phone is mainly used as an example, and some structures of the dual-screen mobile phone are described. For other specific structures of the mobile phone, refer to the hardware structure and software structure shown in FIG. 2 and FIG. 3.

The electronic device in embodiments of this application includes a system on chip SOC, an ASIC chip, a plurality of displays, and a toggle switch. The SOC is used to control, with the toggle switch, one or more of a connection relationship between an SOC interface and the ASIC chip, connection relationships between SOC interfaces and the plurality of displays, and connection relationships between the ASIC chip and the plurality of displays. In this way, when only one ASIC chip is set, by adding one or more toggle switches and modifying data transmission relationships between the SOC, the ASIC chip, and the displays, the one ASIC chip can provide image data obtained through image quality processing to the plurality of displays.

The following describes connection relationships between components, and describes a process of implementing single-screen display (the ASIC chip provides post-processing image data to one of the displays) and a process of implementing multi-screen display in combination with specific embodiments.

In the following embodiments, an example in which there are two screens is used for description. In some embodiments, there may be three screens, four screens, and the like. A quantity of the screens is not limited in this application.

Embodiment 1

Figure 4A:
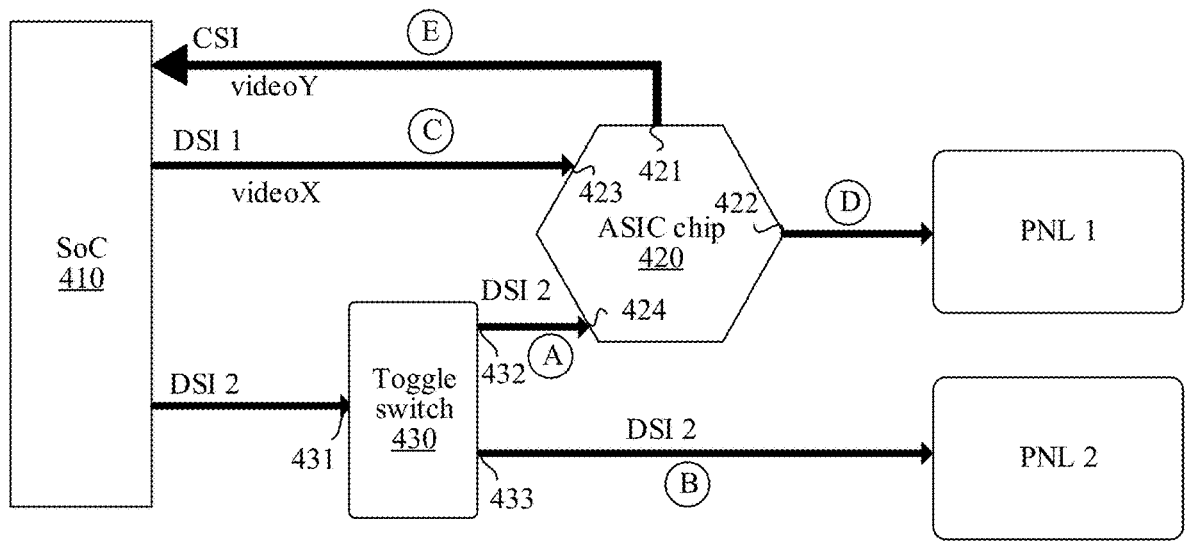
FIG. 4*a* is a schematic diagram of a structure including a single toggle switch in a dual-screen mobile phone according to an embodiment of this application.

Refer to FIG. 4a. FIG. 4a is a schematic diagram of a structure including a single toggle switch in a dual-screen mobile phone according to an embodiment of this application. As shown in FIG. 4a, the mobile phone includes an SoC 410 (equivalent to the processor 110 in FIG. 2 or including the processor 110), an ASIC chip 420, a toggle switch 430, and two displays, for example, a display PNL 1 (corresponding to a first display) and a display PNL 2 (corresponding to a second display) in FIG. 4. As shown in FIG. 4a, the SoC 410 includes a camera serial interface CSI and two display serial interfaces DSIs, for example, a DSI 1 and a DSI 2 in FIG. 4. The camera serial interface CSI is used to return data processed by the ASIC chip 420 to the SoC 410, and at least one of the two display serial interfaces is used by the SoC 410 to transmit to-be-processed data to the ASIC chip 420. The ASIC chip 420 includes an output port 421, an output port 422, an input port 423, and an input port 424. The toggle switch includes an input port 431, an output port 432, and an output port 433.

Corresponding channels between the ports are described below.

As shown in FIG. 4, the CSI is connected with the output port 421 of the ASIC chip, and a transmission channel E is formed. The DSI 1 is connected with the input port 413 of the ASIC chip, and a transmission channel C is formed. The output port 422 of the ASIC chip is connected with the PNL 1, and a transmission channel D for outputting a signal to the display PNL 1 is formed. The input port 431 of the toggle switch is connected with the DSI 2, the output port 432 is connected with the ASIC chip, and a transmission channel A is formed. The output port 433 is connected with the display PNL 2, and a transmission channel B is formed.

The following describes data flows between the channels with reference to the accompanying drawings. As shown in FIG. 4a, in the embodiment of this application, the channel E is used to return image data processed by the ASIC chip to the SoC. The transmission channel C is used to output a signal from the SoC to the ASIC chip, for example, output to-be-processed image data. The transmission channel D is used to output a signal to the PNL 1. For example, the signal may be a signal generated through enhancement processing by the ASIC chip on an image transmitted through the channel C or the channel A, or a signal generated for an image transmitted by the SoC through the channel C. The transmission channel A is used to transmit a signal, for example, a before-processing image signal, output by the DSI 2 of the SoC to the ASIC chip. The transmission channel B is used to transmit a signal output through the DSI 2 of the SoC to the display PNL 2. The signal may be image data that is processed by the ASIC chip and output through the DSI 2, or a signal corresponding to data that is output by the SoC through the DSI 2 and that does not need to be processed. It should be noted that, a signal output by the DSI 2 may be of a type different from that of a signal output by the DSI 1. For example, the DSI 1 may output an image signal, and the DSI 1 may output an image signal like a bullet screen or a text. In some embodiments, a to-be-processed image signal may also be output by the DSI 1. This is not limited herein. Descriptions in the following embodiments are similar to descriptions herein.

Based on data flows between the foregoing channels and with reference to specific accompanying drawings and Table 1, the following describes flow directions of data flows in different display scenarios and implementation of single-screen display and dual-screen display through adjusting, by the SoC, the connection relationships between the DSI 2, the ASIC chip, and the displays with a toggle switch. Specifically, the following scenarios may be included. Refer to Table 1.

TABLE 1

| Scenario | Solution | Implementation |
|---|---|---|
| Scenario 1 | Dual-screen display | (1) The ASIC chip is on/off. (2) A is closed and B is opened. (3) C and D are opened. |
| Scenario 2 | PNL 1 + ASIC chip | (1) The ASIC chip is on/off. (2) A is opened and B is closed. (3) C and D are opened. |
| Scenario 3 | PNL 2 + ASIC chip | (1) The ASIC chip is on/off. (2) A is closed and B is opened. (3) C is opened, D is closed, and E is opened. |

It should be noted that, in the table, the ASIC chip being on indicates that the ASIC chip is in an on state and the ASIC chip can enhance and optimize an unprocessed image signal. The ASIC chip being off indicates that the ASIC chip is in an off state. In this case, the ASIC chip is only used as a common transmission channel, and does not enhance or optimize an image signal. In this application, the SoC can turn on or off the ASIC chip based on a received request indicating whether enhancement and optimization on an image is requested. Meaning of the ASIC chip being on/off in the following embodiments is the same as the meaning described herein, and therefore is not repeated in the following descriptions.

Figure 4B:
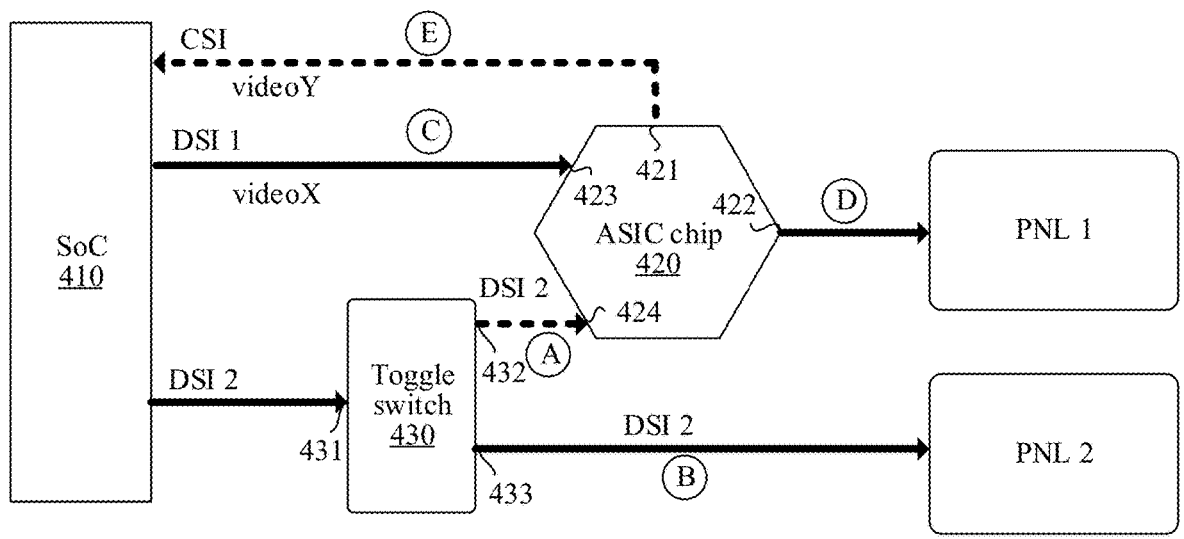
FIG. 4*b* is a schematic diagram of a connection structure in a scenario 1 in Table 1 according to an embodiment of this application.

Refer to FIG. 4b. FIG. 4b is a schematic diagram of the connection structure in the scenario 1 in Table 1. The scenario 1 is a dual-screen display scenario, that is, the PNL 1 and the PNL 2 implement display simultaneously. FIG. 4b shows switch control and data flow directions in this scenario. When receiving the instruction of dual-screen display, the SoC executes the instruction and controls the toggle switch 430, to connect the DSI 2 with the PNL 2. To be specific, the channel A is closed and the channel B is opened, so that the DSI 2 is connected with the PNL 2. The channel C and the channel D are opened to connect the DSI 1 with the PNL 1. If the instruction of dual-screen display does not include a request for image signal optimization processing, a data flow direction to the PNL 1 is as follows. To implement display by the PNL 1, the SoC outputs an unprocessed image signal through the DSI 1, and transmits the signal to the PNL 1 through the channel C, the ASIC chip in an off state, and the channel D. A data flow direction to the PNL 2 is as follows. To implement display by the PNL 2, the SoC outputs an unprocessed image signal through the DSI 2, and transmits the signal to the PNL 2 through the channel B.

In the foregoing process, if the instruction of dual-screen display includes the request for image signal optimization processing corresponding to the PNL 1, the SoC turns on the ASIC chip, outputs the unprocessed image signal through the DSI 1, and transmits the signal to the ASIC chip through the channel C. Then the ASIC chip processes the unprocessed image signal, and transmits a processed image signal to the PNL 1 through the channel D. In this case, the PNL 1 may implement regular display (a displayed image is not processed by the ASIC chip), and may also implement enhanced and optimized display (a displayed image is enhanced and optimized by the ASIC chip).

Figure 4C:
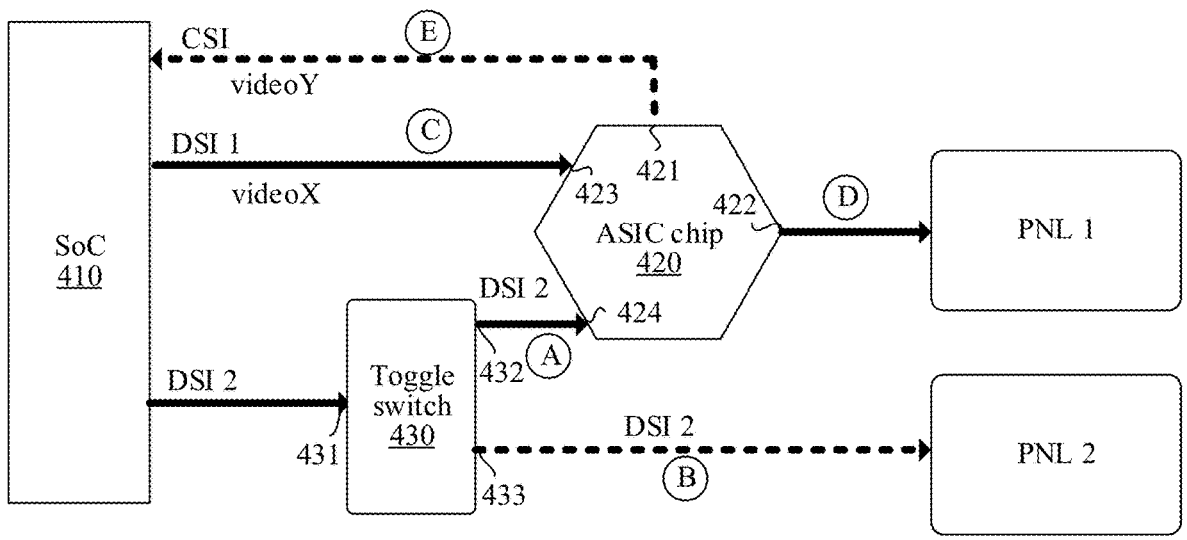
FIG. 4*c* is a schematic diagram of a connection structure in a scenario 2 in Table 1 according to an embodiment of this application.

Refer to FIG. 4c. FIG. 4c is a schematic diagram of the connection structure in the scenario 2 in Table 1. The scenario 2 is a scenario in which only the PNL 1 implements display, and the PNL 1 may implement enhanced and optimized image display. FIG. 4c shows toggle switch control by the SoC and data flow directions in this scenario. When the SoC receives an instruction of display by the PNL 1, the SoC executes the instruction, and controls the toggle switch 430, to connect the DSI 2 with the ASIC chip and connect the ASIC chip with the PNL 1. If enhancement and optimization processing is required in the instruction, the SoC controls the ASIC chip to turn on, closes the channel B, and opens the channel A, the channel C, and the channel D, to connect the two interfaces of the SoC with the ASIC chip and connect the ASIC chip with the PNL 1. The SoC sends a to-be-processed image signal to the ASIC chip through at least one of the channel A and the channel C. The ASIC chip processes the image signal to obtain a processed image signal. The ASIC chip sends the processed image signal to the PNL 1 through the channel D, so that the PNL 1 can implement enhanced and optimized image display.

In the scenario 2, if the instruction does not include the request for enhancement and optimization, the SoC does not need to turn on the ASIC chip, that is, the ASIC chip does not process the image signal, and the SoC directly outputs the unprocessed image signal to the PNL 1.

Figure 4D:
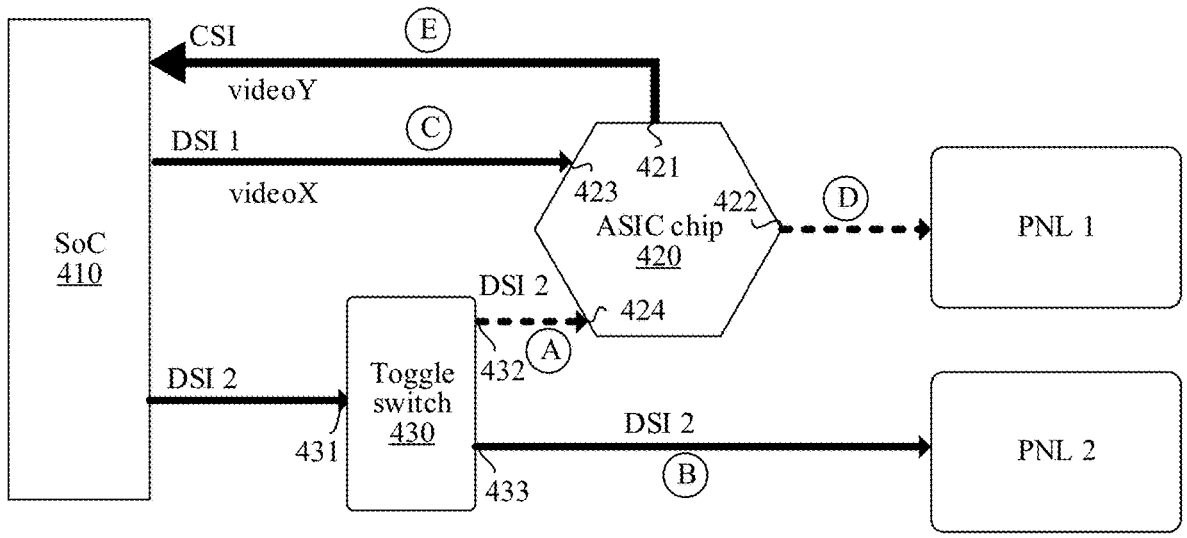
FIG. 4*d* is a schematic diagram of a connection structure in a scenario 3 in Table 1 according to an embodiment of this application.

Refer to FIG. 4d. FIG. 4d is a schematic diagram of the connection structure in the scenario 3 in Table 1. The scenario 3 is a scenario in which only the PNL 2 implements display, and the PNL 2 may implement enhanced and optimized image display. FIG. 4d shows toggle switch control by the SoC and data flow directions in this scenario. When the SoC receives an instruction of display by the PNL 2, the SoC executes the instruction, and controls the toggle switch 430 to connect the DSI 2 with the PNL 2. If a request for enhancement and optimization processing is included in the instruction, the SoC turns on the ASIC chip, closes the channel A and the channel D, and opens the channel B, the channel C, and the channel E, to connect with the ASIC chip through the CSI interface and the interface DSI 1 and connect with the PNL 2 through the DSI 2. When transmitting data, the SoC sends a to-be-processed image signal, like "videoX", to the ASIC chip through the channel C. The ASIC chip processes the image signal to obtain a processed image signal like "videoY". The ASIC chip returns the "videoY" to the SoC through channel E. The SoC sends the processed image signal to the PNL 2 through the channel B, so that the PNL 2 can implement enhanced and optimized image display.

In the scenario 3, if the instruction does not include the request for enhancement and optimization, the SoC does not need to turn on the ASIC chip, that is, the ASIC chip does not process the image signal, and the SoC directly outputs the unprocessed image signal to the PNL 2.

It should be noted that, when the channel D is closed, the software module may be used to control the ASIC chip not to provide data to the PNL 1. Alternatively, a single-way switch is set, and the SoC closes the channel D by controlling the switch. A manner of closing the channel is not limited in this application.

The electronic device according to this embodiment of this application can implement simultaneous multi-screen display, and can also implement separate connection of one ASIC chip with a plurality of displays, so that each display can obtain an enhanced image. This improves user experience.

Embodiment 2

Figure 5A:
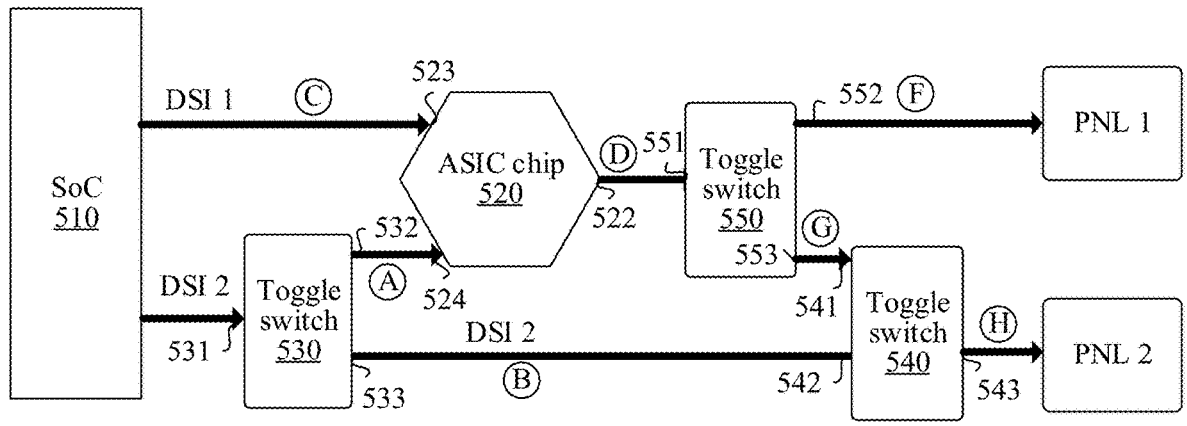
FIG. 5*a* is a schematic diagram of a structure including a plurality of toggle switches in a dual-screen mobile phone according to another embodiment of this application.

Refer to FIG. 5a. FIG. 5a is a schematic diagram of a structure including a plurality of toggle switches in a dual-screen mobile phone according to another embodiment of this application. On the basis of the structure in FIG. 4a, two toggle switches are added to this structure, so as to improve a data processing speed.

As shown in FIG. 5a, the mobile phone includes an SoC 510, an ASIC chip 520, a toggle switch 530, a toggle switch 540, a toggle switch 550, and two displays such as a display PNL 1 and a display PNL 2 in FIG. 5a.

As shown in FIG. 5a, the SoC includes two display serial interfaces, for example, a DSI 1 and a DSI 2 in FIG. 5a. The ASIC chip 520 includes an output port 521, an output port 522, an input port 523, and an input port 524. The toggle switch 530 includes an input port 531, an output port 532, and an output port 533. The toggle switch 540 includes an input port 541, an input port 542, and an output port 543. The toggle switch 550 includes an input port 551, an output port 552, and an output port 553.

Corresponding channels between the ports are described below.

As shown in FIG. 5a, the DSI 1 is connected with the input port 523 of the ASIC chip, and a transmission channel C is formed. The input port 531 of the toggle switch 530 is connected with the DSI 2, the output port 532 is connected with the input port 524 of the ASIC chip, and a transmission channel A is formed. The output port 33 is connected with the input port 542 of the toggle switch 540, and a transmission channel B is formed. The input port 541 of the toggle switch 540 is connected with the output port 553 of the toggle switch 550, and a transmission channel G is formed. The output port 552 is connected with the display PNL 2, and a transmission channel H is formed. The input port 551 of the toggle switch 550 is connected with the output port 522 of the ASIC chip, and a transmission channel D is formed. The output port 552 of the toggle switch 550 is connected with the display PNL 1, and a transmission channel F is formed.

The following describes data flows between the channels with reference to the accompanying drawings.

As shown in FIG. 5a, in this embodiment of this application, a signal, for example, an unprocessed image signal, may be output from the DSI 1 of the SoC to the ASIC chip through the transmission channel C. The signal may be processed by the ASIC chip to obtain a processed image signal, or directly transmitted to the PNL 1 or the PNL 2 without processing by the ASIC chip. Through the transmission channel A, a signal may be output from the DSI 2 of the SoC to the ASIC chip. A type of the signal may be the same as or different from that of the signal transmitted through the transmission channel C (data is not repeated), for example, an unprocessed image signal or a data signal like a bullet screen or a text is output. The transmission channel B and the transmission channel H are used to output a signal from the DSI 2 of the SoC to the display PNL 2. The signal may be an unprocessed image signal. The transmission channel D and the transmission channel F are used to output a signal from the ASIC chip to the display PNL 1. The signal may be an image signal processed by the ASIC chip or unprocessed image signal. The transmission channel D, the transmission channel G, and the transmission channel H are used to output a signal from the ASIC chip to the display PNL 1. The signal may be an image signal processed by the ASIC chip or an unprocessed image signal.

With reference to the data flows between the foregoing channels and specific drawings, the following describes flow directions of data flows in different display scenarios and implementation of single-screen display and dual-screen display of a mobile phone through adjusting, by the SoC, the connection relationships between the DSI 1, the DSI 2, the ASIC chip, and the displays with three toggle switches. Specifically, the following scenarios may be included. Refer to Table 2.

signal optimization processing corresponding to the PNL 1, the SoC turns on the ASIC chip, outputs the unprocessed image signal through the DSI 1, and transmits the signal to the ASIC chip through the channel C. Then the ASIC chip processes the unprocessed image signal, and transmits a processed image signal to the PNL 1 through the channel D and the channel F. In this case, the PNL 1 may implement regular display (a displayed image is not processed by the ASIC chip), and may also implement enhanced and optimized display (a displayed image is enhanced and optimized by the ASIC chip).

Figure 5B:
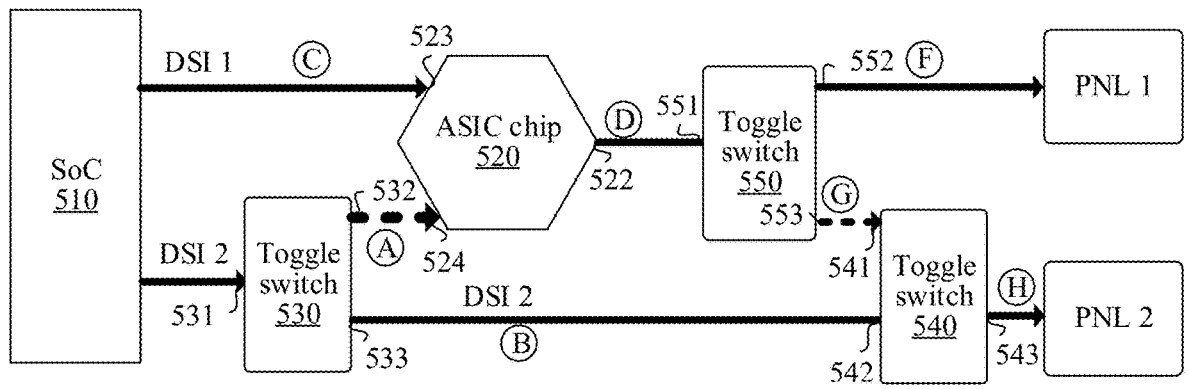
FIG. 5*b* is a schematic diagram of a connection structure corresponding to a scenario 1 in Table 2 according to another embodiment of this application.
Figure 5C:
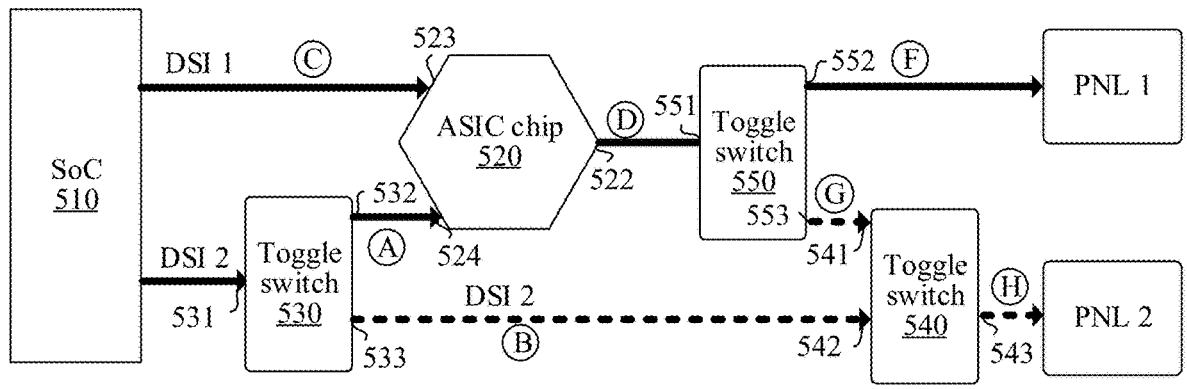
FIG. 5*c* is a schematic diagram of a connection structure corresponding to a scenario 2 in Table 2 according to another embodiment of this application.

Refer to FIG. 5c. FIG. 5c is a schematic diagram of the connection structure corresponding to the scenario 2 in Table 2. The scenario 2 is a scenario in which only the PNL 1 implements display, and the PNL 1 may implement enhanced and optimized image display. FIG. 5c shows toggle switch control by the SoC and data flow directions in this scenario. When the SoC receives an instruction of display by the PNL 1, if the instruction includes a request for image enhancement and optimization processing, the SoC executes the instruction and turns on the ASIC chip, and the SoC controls the toggle switch 530, the toggle switch 540, and the toggle switch 550, closes the channel B, the channel G, and the channel H, and closes the channel A, the channel C, the channel D, and the channel F, to connect the interfaces DSI 1 and DSI 2 of the SoC with the ASIC chip, so that the ASIC chip is connected with the PNL 1. A data processing process is as follows. The SoC sends an unprocessed image signal to the ASIC chip through one or two of the channel A and the channel C. The ASIC chip processes the image signal, obtains a processed image signal, and sends the

TABLE 2

| Scenario | Solution | Implementation |
| --- | --- | --- |
| Scenario 1 | Dual-screen display | (1) The ASIC chip is on/off. (2) A/G is closed. (3) C/D/F/B/H is opened. |
| Scenario 2 | PNL 1 + ASIC chip | (1) The ASIC chip is on/off. (2) B/G/H is closed. (3) A/C/D/F is opened. |
| Scenario 3 | PNL 2 + ASIC chip | (1) The ASIC chip is on/off. (2) B/F is closed. (3) A/C/D/G/H is opened. |

Refer to FIG. 5b. FIG. 5b is a schematic diagram of the connection structure corresponding to the scenario 1 in Table 2. The scenario 1 is a dual-screen display scenario, that is, the PNL 1 and the PNL 2 implement display simultaneously. FIG. 5b shows switch control and data flow directions in this scenario. When receiving an instruction of dual-screen display, the SoC executes the instruction and controls the toggle switch 530, the toggle switch 540, and the toggle switch 550 to close the channel A and the channel G and open the channel C, the channel D, the channel F, the channel B, and the channel H, so that the DSI 2 is connected with the PNL 2 and the DSI 1 is connected with the PNL 1. If the instruction of dual-screen display does not include a request for image signal optimization processing, a data flow direction to the PNL 1 is as follows. To implement display by the PNL 1, the SoC outputs an unprocessed image signal through the DSI 1, and transmits the signal to the PNL 1 through the channel C, the ASIC chip in the off state, the channel D, and the channel F. A data flow direction to the PNL 2 is as follows. To implement display by the PNL 2, the SoC outputs an unprocessed image signal through the DSI 2, and transmits the signal to the PNL 2 through the channel B and the channel H. In the foregoing process, if the instruction of dual-screen display includes the request for image processed image signal to the PNL 1 through the channel D and the channel F, so that the PNL 1 can implement enhanced and optimized image display. If the instruction does not include the request for enhancement and optimization, the SoC may directly send the signal to the PNL 1 through the channel C, the ASIC chip in an off state, the channel D, and the channel F, so that the PNL 1 may implement enhanced and optimized display, or may implement regular display.

Figure 5D:
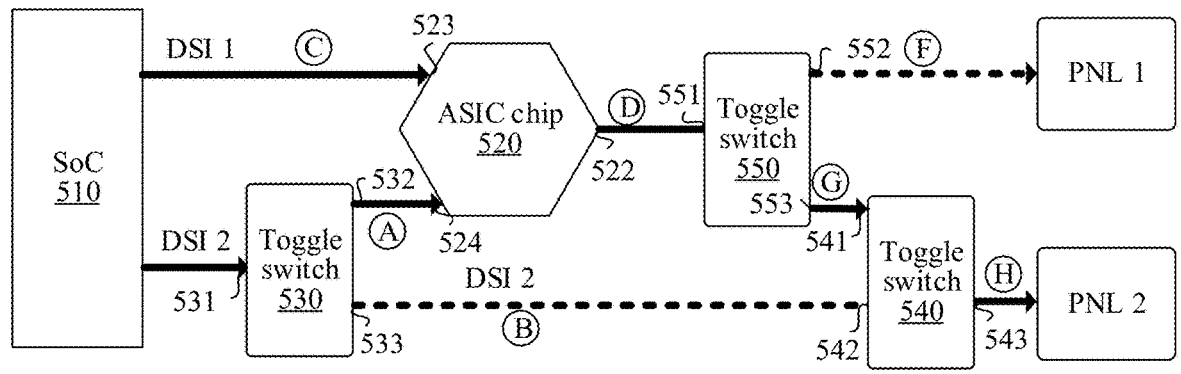
FIG. 5*d* is a schematic diagram of a connection structure corresponding to a scenario 3 in Table 2 according to another embodiment of this application.

Refer to FIG. 5d. FIG. 5d is a schematic diagram of the connection structure corresponding to the scenario 3 in Table 2. The scenario 3 is a scenario in which only the PNL 2 implements display, and the PNL 2 may implement enhanced and optimized image display. FIG. 5d shows toggle switch control by the SoC and data flow directions in this scenario. When the SoC receives an instruction of display by the PNL 2, if the instruction includes a request for image enhancement and optimization processing, the SoC executes the instruction and turns on the ASIC chip, and the SoC controls the toggle switch 530, the toggle switch 540, and the toggle switch 550, closes the channel B and the channel F, and opens the channel A, the channel C, the channel D, the channel G, and the channel H, so that the ASIC chip is connected with the display PNL 2. During data transmission, the SoC sends a to-be-processed image signal to the ASIC chip through one or two of the transmission channel A and the transmission channel C. The ASIC chip performs post-processing on the image signal, obtains a processed image signal, and sends the processed image signal to the PNL 2 through the transmission channel D, channel G, and channel H, so that the PNL 2 can implement enhanced and optimized display of the image signal. Compared with Embodiment 1, in this method, the ASIC chip does not need to return data to the SoC, but can directly transmit the data to the PNL 2. Therefore, this method has more advantages in terms of power consumption, data delay, and implementation of system software.

Embodiment 3

Figure 6A:
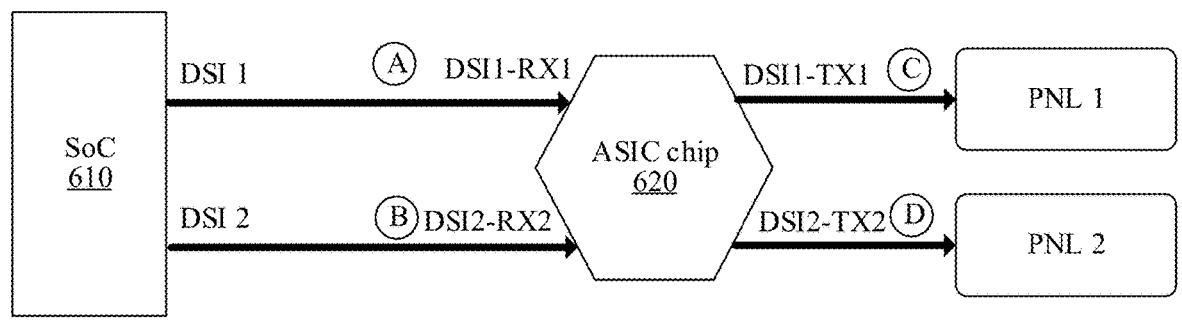
FIG. 6*a* is a schematic diagram of a structure in which a toggle switch is integrated in a chip of a dual-screen mobile phone according to an embodiment of this application.

Refer to FIG. 6*a*. FIG. 6*a* is a schematic diagram of a structure in which a toggle switch is integrated in a chip of a dual-screen mobile phone according to an embodiment of this application. From the perspective of an external structure, wiring outside an ASIC chip is simple. As shown in FIG. 6*a*, the mobile phone includes an SoC 610, an ASIC chip 620, and two displays (such as a PNL 1 and a PNL 2).

Figure 6B:
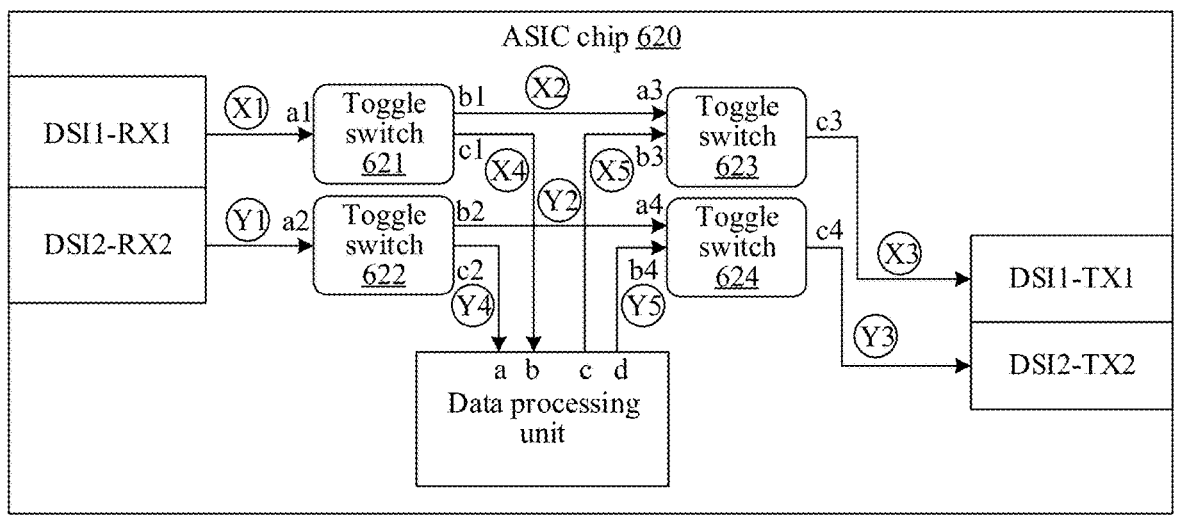
FIG. 6*b* is a schematic diagram of an internal structure of an ASIC chip according to an embodiment of this application.

As shown in FIG. 6*a*, the SoC includes two display serial interfaces, such as a DSI 1 and a DSI 2 in FIG. 6. The ASIC chip 620 includes two input ports and two output ports. Specific ports are shown in FIG. 6*b*. The ASIC chip 620 includes an input port DSI1-RX1, an input port DSI2-RX2, an output port DSI1-TX1, and an output port DSI2-TX2.

Corresponding channels between the ports are described below.

As shown in FIG. 6*a*, the interface DSI 1 of the SoC is connected with the input port DSI1-RX1 of the ASIC chip, and a transmission channel A is formed. The interface DSI 2 of the SoC is connected with the input port DSI2-RX2 of the ASIC chip, and a transmission channel B is formed. The output port DSI1-TX1 of the ASIC chip is connected with the display PNL 1, and a transmission channel C is formed. The output port DSI2-TX2 of the ASIC chip is connected with the display PNL 2, and a transmission channel D is formed.

The transmission channel A and the transmission channel B are used by the SoC to output a signal to the ASIC chip, for example, to-be-processed image data. The output signal may be processed by the ASIC chip, and a processed image signal is transmitted to the PNL 1 or the PNL 2. The transmission channel C is used to output a signal to the display PNL 1. The transmission channel D is used to output a signal to the display PNL 2.

An internal structure of the ASIC chip is described below.

Refer to FIG. 6*b*. FIG. 6*b* is a schematic diagram of an internal structure of an ASIC chip according to an embodiment of this application. Compared with those in the structures in FIG. 4 and FIG. 5, in the structure herein, the control switches are integrated to the ASIC chip. For the hardware structure, a circuit covers a smaller area and takes up smaller space. As shown in FIG. 6*b*, the ASIC chip includes a data processing unit, a toggle switch 621, a toggle switch 622, a toggle switch 623, a toggle switch 624, and a plurality of interfaces (corresponding to the interfaces in FIG. 6*a*). The data processing unit is a core component for post-processing of image data. When image data obtained through processing by the data processing unit is displayed on the display, an enhanced and optimized visual effect can be achieved.

As shown in FIG. 6*b*, the plurality of interfaces of the ASIC chip are an input port DSI1-RX1 for connection with a DSI 1, an input port DSI1-RX2 for connection with a DSI 2, an output port DSI1-TX1 for connection with a PNL 1, and an output port DSI2-RX2 for connection with a PNL 2. The data processing unit includes an input port a, an input port b, an output port c, and an output port d. The toggle switch 621 includes an input port a1, an output port b1, and an output port c1. The toggle switch 622 includes an input port a2, an output port b2, and an output port c2. The toggle switch 623 includes an input port a3, an input port b3, and an output port c3. The toggle switch 624 includes an input port a4, an input port b4, and an output port c4.

The following describes corresponding channels between the ports in the ASIC chip.

As shown in FIG. 6*b*, the input interface DSI1-RX1 of the ASIC chip is connected with the input port a1 of the toggle switch 621, and a transmission channel X1 is formed. The output port b1 of the toggle switch 621 is connected with the input port a3 of the toggle switch 623, and a transmission channel X2 is formed. The output port c1 is connected with the input port b of the data processing unit, and a transmission channel X4 is formed. The input port b3 of the toggle switch 623 is connected with the output port c of the data processing unit, and a transmission channel X5 is formed. An output port c3 is connected with the output interface DSI1-TX1 of the ASIC chip, and a transmission channel X3 is formed.

The input interface DSI2-RX2 of the ASIC chip is connected with the input port a2 of the toggle switch 622, and a transmission channel Y1 is formed. The output port b2 of the toggle switch 622 is connected with the input port a4 of the toggle switch 624, and a transmission channel Y2 is formed. The output port c2 is connected with the input port a of the data processing unit, and a transmission channel Y4 is formed. The input port b4 of the toggle switch 624 is connected with the output port d of the data processing unit, and a transmission channel Y5 is formed. The output port c4 is connected with the output interface DSI2-TX2 of the ASIC chip, and a transmission channel Y3 is formed.

A transmission path formed by the transmission channels X1, X2, and X3 is used to transmit a signal input through the DSI1-RX1. The path is finally connected with the transmission channel C in FIG. 6*a*, so that connection with the display PNL 1 is achieved, and the signal can be output to the PNL 1. The signal is not transmitted to the data processing unit, and is not processed by the ASIC chip.

A transmission path formed by the transmission channels X1, X4, X5, and X3 is used to transmit a to-be-processed image signal input through the DSI1-RX1 to the data processing unit for processing. The data processing unit then transmits a processed image signal to the DSI1-TX1, and the processed image signal is transmitted to the display PNL 1 through the transmission channel C.

A transmission path formed by the transmission channels Y1, Y2, and Y3 is used to transmit a signal input through the DSI2-RX2. The path is finally connected with the transmission channel D in FIG. 6*a*, so that connection with the display PNL 2 is achieved, and the signal can be output to the PNL 2. The signal is not transmitted to the data processing unit, and is not processed by the ASIC chip.

A transmission path formed by the transmission channels Y1, Y4, Y5, and Y3 is used to transmit a to-be-processed image signal input through the DSI2-RX2 to the data processing unit for processing. The data processing unit then transmits a processed image signal to the DSI2-TX2, and the processed image signal is transmitted to the display PNL 2 through the transmission channel D.

With reference to FIG. 6*a*, FIG. 6*b*, and Table 3, the following describes flow directions of data flows in different display scenarios and implementation of single-screen display and dual-screen display through adjusting, by the SoC, the connection relationships between the DSI 1, the DSI 2, the ASIC chip, and the displays with four toggle switches. Specifically, the following scenarios may be included. Refer to Table 3.

TABLE 3

| Scenario | Solution | Implementation |
| --- | --- | --- |
| Scenario 1 | Dual-screen display | (1) The ASIC chip is on/off, and a signal is transmitted to the PNL 1 through the channel A and the channel C.<br>(2) The ASIC chip is on/off, and a signal is transmitted to the PNL 2 through the channel B and the channel D. |
| Scenario 2 | PNL 1 + ASIC chip | (1) The ASIC chip is on/off. (2) A/B/C is opened, or A/C is opened. (3) D is closed, or B/D is closed. (4) An internal structure of the ASIC chip is as follows. X1/X4/X5/X3 is opened, and other channels are closed. Alternatively, X1/X4/Y1/Y4/X5/X3 is opened, and X2/Y2/Y5/Y3 is closed. |
| Scenario 3 | PNL 2 + ASIC chip | (1) The ASIC chip is on/off. (2) A/B/D is opened, or B/D is opened. (3) C is closed, or A/C is closed. (4) An internal structure of the ASIC chip is as follows. Y1/Y4/Y5/Y3 is opened, and other channels are closed. Alternatively, X1/X4/Y1/Y4/X5/X3 is opened, and X2/Y2/X5/Y3 is closed. |

Refer to FIG. 6a, FIG. 6b, and Table 3. The scenario 1 is a dual-screen display scenario, that is, the PNL 1 and the PNL 2 implement display simultaneously. In this scenario, when the SoC receives an instruction of dual-screen display by the PNL 1 and the PNL 2, if the instruction does not include the request for enhancement and optimization, the SoC executes the instruction, and controls the toggle switch 621 and the toggle switch 623 to connect the channel X1, the channel X2, and the channel X3, so that the DSI 1 and the PNL 1 are directly connected. The SoC controls the toggle switch 622 and the toggle switch 624 to connect the channel Y1, the channel Y2, and the channel Y3, so that the DSI 2 and the PNL 2 are directly connected. A data flow direction to the PNL 1 is as follows. An unprocessed image signal is output by the SoC through the DSI 1, transmitted to the input port DSI1-RX1 of the ASIC chip through the channel A, transmitted to the output port DSI1-TX1 through the channel X1, the channel X2, and the channel X3, and transmitted to the PNL 1 through the channel C, so that the PNL 1 can implement display. A data flow direction to the PNL 2 is as follows. An unprocessed image signal is output by the SoC through the DSI 2, transmitted to the input port DSI2-RX2 of the ASIC chip through the channel B, transmitted to the output port DSI2-TX2 through the channel Y1, the channel Y2, and the channel Y3, and transmitted to the PNL 2 through the channel D, so that the PNL 2 can implement display.

If the instruction includes a request for enhancement and optimization on the PNL 1, the SoC executes the instruction, turns on the ASIC chip, and controls the toggle switch 621 and the toggle switch 623, to connect the channel X1, the channel X4, the channel X5, and the channel X3, so that the DSI 1 is connected with the data processing unit, and the data processing unit is directly connected with the PNL 1. A data flow direction is as follows. An unprocessed image signal is output by the SoC through the DSI 1, transmitted to the input port DSI1-RX1 of the ASIC chip through channel A, and transmitted to the data processing unit through the channel X1 and the channel X4. The data processing unit processes the image signal, and then transmits a processed image signal to the output port DSI1-TX1 through the channel X5 and the channel X3, and the signal is transmitted to the PNL 1 through the channel C. In this way, the PNL 1 can implement enhanced and optimized image display.

If the instruction includes a request for enhancement and optimization on the PNL 2, the SoC executes the instruction and turns on the ASIC chip, and the SoC controls the toggle switch 622 and the toggle switch 624, to connect the channel Y1, the channel Y4, the channel Y5, and the channel Y3, so that the DSI 2 can be directly connected with the PNL 2. A data flow direction is as follows. An unprocessed image signal is output by the SoC through the DSI 2, transmitted to the input port DSI2-RX2 of the ASIC chip through the channel B, and transmitted to the data processing unit through the channel Y1 and the channel Y4. The data processing unit processes the image signal, and transmits a processed image signal to the output port DSI2-TX2 through the channel Y5 and the channel Y3. The signal is transmitted to the PNL 2 through the channel D, so that the PNL 2 can implement enhanced and optimized image display.

In this application, the scenario 2 is the scenario in which only the PNL 1 implements display. This scenario further includes a scenario of single-way connection between the PNL 1, the SoC, and the ASIC chip, and a scenario of two-way connection between the PNL 1, the SoC, and the ASIC chip. For selection of single-way connection and two-way connection, the SoC may perform selection according to preset rules. For example, in a regular case, two-way connection is selected by default, or when an SoC utilization rate reaches a set value, for example, when the utilization rate exceeds 70%, single-way connection may be selected. In this application, a single-way connection manner and a two-way connection manner are not limited.

The scenario of single-way connection between the PNL 1, the SoC, and the ASIC chip in the scenario 2 is first described. When the SoC receives the instruction of display by the PNL 1, if the instruction includes a request for image enhancement and optimization, the SoC executes the instruction, turns on the ASIC chip, opens the channel A and channel C, and closes the channel B and the channel D. An internal structure that is of the ASIC chip and that is controlled by the SoC is as follows. The channel X1, channel X4, the channel X5, and the channel X3 are opened. The rest of the channels are closed. In this case, single-way connection between the DSI 1 and the ASIC chip is implemented, and the ASIC chip is connected with the PNL 1. A data flow direction is as follows. The SoC sends a to-be-processed image signal to the data processing unit of the ASIC chip through the channel X1 and the channel X4. The data processing unit of the ASIC chip obtains the image signal, processes the image signal, and obtains a processed image signal. The ASIC chip sends the processed image signal to the PNL 1 through the channel X5 and the channel X3. In this way, the PNL 1 can implement enhanced and optimized display of the image signal. If the instruction does not include the request for image enhancement and optimization, the signal is transmitted to the output port DSI1-TX1 through the channel X1, the channel X2, and the channel X3, and then transmitted to the PNL 1 through the channel C, so that the PNL 1 can implement regular display.

The scenario of two-way connection between the PNL 1, the SoC, and the ASIC chip in the scenario 2 is the described. When the SoC receives the instruction of display by the PNL 1, if the instruction includes the request for image enhancement and optimization, the SoC executes the instruction, turns on the ASIC chip, opens the channel A, the channel B, and the channel C, and closes the channel D. An internal structure that is of the ASIC chip and that is controlled by the SoC is as follows. The channel X1, the channel X4, the channel Y1, the channel Y4, the channel X5, and the channel X3 are opened. The channel X2, the channel Y2, channel Y5, and the channel Y3 are closed. In this case, two-way connection between the DSI 1, the DSI 2, and the ASIC chip is implemented, and the ASIC chip is connected with the PNL 1. A data flow direction is as follows. The SoC sends an unprocessed image signal to the data processing unit of the ASIC chip through the channel X1, the channel X4, the channel Y1, and the channel Y4. The data processing unit of the ASIC chip obtains the image signal, and processes the image to obtain a processed image signal. The data processing unit of the ASIC chip sends the processed image signal to the PNL 1 through the channel X5 and the channel X3. In this way, the PNL 1 can implement enhanced and optimized display of the image signal.

In an embodiment of this application, if in the scenario 2, the instruction does not include the request for image enhancement and optimization, the SoC can control the toggle switch to connect the channel A, the channel X1, the channel X2, the channel X3, and the channel C. The unprocessed image signal is transmitted to the output port DSI1-TX1 through the channel X1, the channel X2, and the channel X3, and transmitted to the PNL 1 through the channel C, so that the PNL 1 can implement regular display. For this process, refer to the switch control process and the data flow directions corresponding to display by the PNL 1 in the scenario 1.

The scenario 3 is the scenario in which only the PNL 2 implements display. This scenario further includes a scenario of single-way connection between the PNL 2, the SoC, and the ASIC chip, and a scenario of two-way connection between the PNL 2, the SoC, and the ASIC chip.

The scenario of single-way connection between the PNL 2, the SoC, and the ASIC chip in the scenario 3 is first described. When the SoC receives the instruction of display by the PNL 2, if the instruction includes the request for image enhancement and optimization, the SoC executes the instruction, turns on the ASIC chip, opens the channel B and the channel D, and closes the channel C. An internal structure of the ASIC chip is as follows. The channel Y1, the channel Y4, the channel Y5, and the channel Y3 are opened. Other channels are closed. In this case, single-way connection between the DSI 2 and the ASIC chip is implemented, and the ASIC chip is connected with the PNL 2. A data flow direction is as follows. The SoC sends a to-be-processed image signal to the data processing unit of the ASIC chip through the channel Y1 and the channel Y4. The data processing unit of the ASIC chip obtains the image signal, processes the image signal, and obtains a processed image signal. The data processing unit of the ASIC chip sends the processed image signal to the PNL 2 through the channel Y5 and the channel Y3, so that the PNL 2 can implement enhanced and optimized image display.

The scenario of two-way connection between the PNL 2, the SoC, and the ASIC chip in the scenario 3 is the described. When the SoC receives the instruction of display by the PNL 2, if the instruction includes the request for image enhancement and optimization, the SoC executes the instruction, turns on the ASIC chip, opens the channel A, the channel B, and the channel D, and closes the channel C. An internal structure that is of the ASIC chip and that is controlled by the SoC is as follows. The SoC opens the channel X1, the channel X4, the channel Y1, the channel Y4, the channel X5, and the channel X3, and closes the channel X2, the channel Y2, the channel X5, and the channel X3. In this case, two-way connection between the DSI 1, the DSI 2, and the ASIC chip is implemented, and the ASIC chip is connected with the PNL 2. A data flow direction is as follows. The SoC sends an unprocessed image signal to the data processing unit of the ASIC chip through the channel X1, the channel X4, the channel Y1, and the channel Y4. The data processing unit of the ASIC chip obtains the image signal, and processes the image signal to obtain a processed image signal. The data processing unit of the ASIC chip sends the processed image signal to the PNL 2 through the channel Y5 and the channel Y3. In this way, the PNL 2 can implement enhanced and optimized image display.

In an embodiment of this application, if in the scenario 3, the instruction does not include the request for image enhancement and optimization, the SoC can control the toggle switch to connect the channel B, the channel Y1, the channel Y2, the channel Y3, and the channel D. The SoC outputs, from the DSI 2, the unprocessed image signal to the input port DSI2-RX2 of the ASIC chip through the channel B. The signal is transmitted to the output port DSI2-TX2 through the channel Y1, the channel Y2, and the channel Y3, and transmitted to the PNL 2 through the channel D, so that the PNL 2 can implement regular display. For this process, refer to the switch control process and the data flow directions corresponding to display by the PNL 2 in the scenario 1.

The electronic device according to this embodiment of this application can implement simultaneous multi-screen display, and can also implement separate connection of one ASIC chip with a plurality of displays, so that each display can obtain an enhanced image. This improves user experience.

In some embodiments, when simultaneous dual-screen display is not required, a toggle switch may be directly added between the ASIC chip and the plurality of displays, to implement direct connection between the ASIC chip and the plurality of displays.

Embodiment 4

Figure 7:
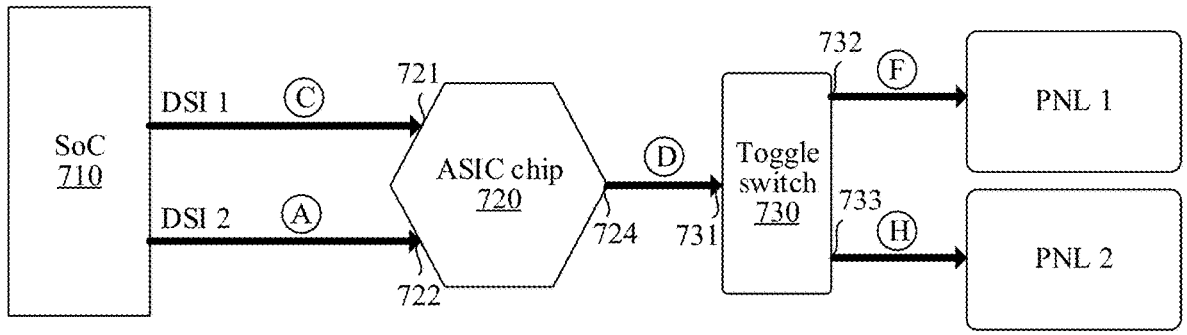
FIG. 7 is a schematic diagram of a structure in a dual-screen mobile phone that does not implement dual-screen display according to an embodiment of this application.

Refer to FIG. 7. FIG. 7 is a schematic diagram of a structure in a dual-screen mobile phone that does not implement dual-screen display according to an embodiment of this application. As shown in FIG. 7, the mobile phone includes an SoC 710, an ASIC chip 720, one toggle switch 730, and two displays such as a PNL 1 and a PNL 2.

As shown in FIG. 7, the SoC includes a display serial interface DSI 1 and a display serial interface DSI 2. The ASIC chip 720 includes an input port 721, an input port 722, an output port 723, and an output port 724. The toggle switch 730 includes an input port 731, an output port 732, and an output port 733.

Corresponding channels between the ports are described below.

As shown in FIG. 7, the interface DSI 1 of the SoC is connected with the input port 721 of the ASIC chip, and a transmission channel C is formed. The DSI 2 is connected with the input port 722 of the ASIC chip, and a transmission channel A is formed. The input port of the toggle switch 730 is connected with the output port 724 of the ASIC chip, and a transmission channel D is formed. The output port 732 is connected with the PNL 1, and a transmission channel F is formed. The output port 733 is connected with the PNL 2, and a transmission channel H is formed.

The following describes data flows between the channels with reference to the accompanying drawings.

As shown in FIG. 7, the transmission channel C is used to output a signal from the DSI 1 of the SoC to the ASIC chip, for example, output a to-be-processed image signal. The image signal may be processed by the ASIC chip and transmitted to the PNL 1 and the PNL 2. The transmission channel A is used to transmit a signal output from the DSI 2 of the SoC to the ASIC chip. The image signal may be processed by the ASIC chip and transmitted to the PNL 1 and the PNL 2. The transmission channel D is used to output a signal to the two displays, for example, a processed image signal. The transmission channel F is used to transmit a signal output by the ASIC chip to the PNL 1. The transmission channel H is used to transmit a signal output by the ASIC chip to the PNL 2.

With reference to data flows between the foregoing channels, specific drawings, and Table 4, the following describes flow directions of data flows in different display scenarios and implementation of enhanced single-screen display through adjusting, by the SoC, the connection relationships between the ASIC chip and the displays with a toggle switch. Specifically, the following scenarios may be included. Refer to Table 4.

TABLE 4

| Scenario | Solution | Implementation |
| --- | --- | --- |
| Scenario 1 | PNL 1 + ASIC chip | (1) The ASIC chip is on/off. (2) A, C, D, and F are opened. (3) H is closed. |
| Scenario 2 | PNL 2 + ASIC chip | (1) The ASIC chip is on/off. (2) A, C, D, and H are opened. (3) F is closed. |

Refer to FIG. 7 and Table 4. The scenario 1 is a scenario in which only the PNL 1 implements display. As shown in FIG. 7, in this scenario, when the SoC receives an instruction of display by the PNL 1, if the instruction includes a request for image enhancement and optimization, the SoC turns on the ASIC chip, and the SoC controls the toggle switch, opens the channel D, the channel F, and one or two of the channel A and the channel C, and closes the channel H, so that the ASIC chip is connected with the PNL 1. A data processing process is as follows. The SoC sends a to-be-processed image signal to the ASIC chip through the channel A and the channel C. The ASIC chip processes the image signal to obtain a processed image signal. The ASIC chip directly sends the processed image signal to the PNL 1 through the channel F, so that the PNL 1 can implement enhanced and optimized display of image data. If the instruction does not include the request for image enhancement and optimization, the SoC does not need to turn on the ASIC chip (the ASIC chip is only used as a channel for data transmission, and does not process image data), and transmits the unprocessed signal to the PNL 1 through the channel D, the channel F, and one or two of the channel A and the channel C, so that the PNL 1 can implement regular display.

The scenario 2 is a scenario in which only the PNL 2 implements display. As shown in FIG. 7, when the SoC receives an instruction of display by the PNL 1, if the instruction includes a request for image enhancement and optimization, the SoC turns on the ASIC chip, and the SoC controls the toggle switch, opens the channel D, the channel H, and one or two of the channel A and the channel C, and closes the channel F, so that the ASIC chip is connected with the PNL 2. A data flow direction is as follows. The SoC sends a to-be-processed image signal to the ASIC chip through the channel A and the channel C. The ASIC chip processes the image signal to obtain a processed image signal. The ASIC chip directly sends the processed image signal to the PNL 2 through the channel H, so that the PNL 2 can implement enhanced and optimized image display. If the instruction does not include the request for image enhancement and optimization, the SoC does not need to turn on the ASIC chip (the ASIC chip is only used as a channel for data transmission, and does not process image data), and transmits the unprocessed signal to the PNL 2 through the channel D, the channel H, and one or two of the channel A and the channel C, so that the PNL 2 can implement regular display.

In the foregoing embodiments, examples in which there are two DSIs are used for descriptions. In some embodiments, when there are more DSIs, connection relationships between the SoC, the ASIC chip, and the displays may include the following cases.

Embodiment 5

Figure 8:
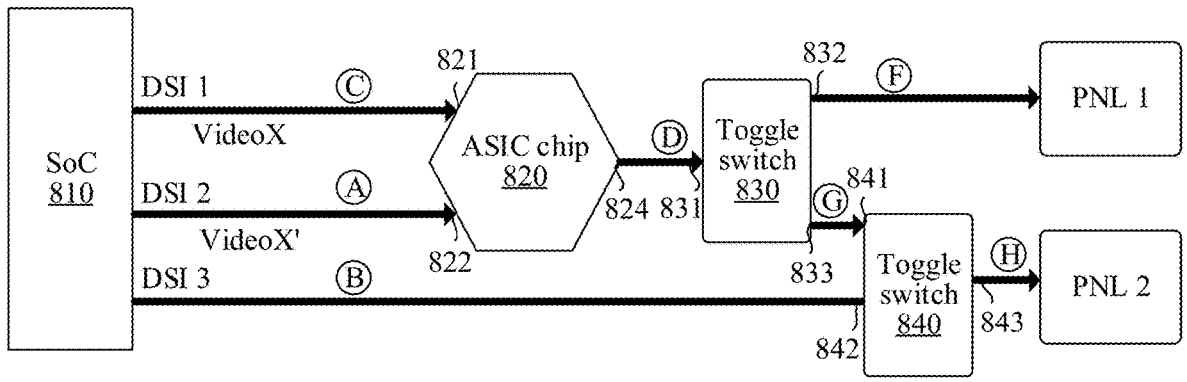
FIG. 8 is a schematic diagram of a structure including three DSIs in a dual-screen mobile phone according to an embodiment of this application.

Refer to FIG. 8. FIG. 8 is a schematic diagram of a structure including three DSIs in a dual-screen mobile phone according to an embodiment of this application. As shown in FIG. 8, the mobile phone includes an SoC 810, an ASIC chip 820, a toggle switch 830, a toggle switch 840, and two displays (such as a PNL 1 and a PNL 2).

As shown in FIG. 8, the SoC includes a display serial interface DSI 1, a display serial interface DSI 2, and a display serial interface DSI 3. The ASIC chip 820 includes an input port 821, an input port 822, an output port 823, and an output port 824. The toggle switch 830 includes an input port 831, an input port 832, and an output port 833. The toggle switch 840 includes an input port 841, an input port 842, and an output port 843.

Corresponding channels between the ports are described below.

As shown in FIG. 8, the DSI 1 is connected with the input port 821 of the ASIC chip, and a transmission channel C is formed. The DSI 2 is connected with the input port 822 of the ASIC chip, and a transmission channel A is formed. The DSI 3 is connected with the input port 842 of the toggle switch, and a transmission channel B is formed. The output port 824 of the ASIC chip is connected with the input port 831 of the toggle switch 830, and a transmission channel D is formed. The output port 832 of the toggle switch 830 is connected with the PNL 1, and a transmission channel F is formed. The output port 833 is connected with the input port 841 of the toggle switch 840, and a transmission channel G is formed. The input port 843 of the toggle switch 840 is connected with the PNL 2, and a transmission channel H is formed.

The transmission channel C and the transmission channel A are used to output a signal from the SoC to the ASIC chip, for example, output to-be-processed image signals "videoX" and "videoX". The transmission channel D is used to output signals to the PNL 1 and the PNL 2. The transmission channel F is used to output a signal to the PNL 1. The transmission channel G and the transmission channel H are used to output a signal to the PNL 2. The transmission channel B is used to output a signal output by the DSI 3 of the SoC. The transmission channel H is used to transmit a signal to the display PNL 2.

With reference to data flows between the foregoing channels, FIG. 8, and Table 5, the following describes flow directions of data flows in different display scenarios and implementation of single-screen display and dual-screen display of a mobile phone through adjusting, by the SoC, the connection relationships between the DSI 1, the DSI 2, the DSI 3, the ASIC chip, and the displays with two toggle switches. Specifically, the following scenarios may be included. Refer to Table 5.

TABLE 5

| Scenario | Solution | Implementation |
| --- | --- | --- |
| Scenario 1 | Dual-screen display | (1) The ASIC chip is on/off. (2) A and G are opened. (3) C, D, F, B, and H are opened. |
| Scenario 2 | PNL 1 + ASIC chip | (1) The ASIC chip is on/off. (2) G, B, and H are closed. (3) A, C, D, and F are opened. |
| Scenario 3 | PNL 2 + ASIC chip | (1) The ASIC chip is on/off. (2) A, C, D, G, and H are opened. (3) F and B are closed. |

Refer to FIG. 8 and Table 5. The scenario 1 is a dual-screen display scenario, that is, the PNL 1 and the PNL 2 implement display simultaneously. As shown in FIG. 8, when receiving an instruction of dual-screen display, the SoC executes the instruction, and the SoC controls the toggle switch 820 and the toggle switch 830, to close the channel A and the channel G and open the channel C, the channel D, the channel F, the channel B, and the channel H, so that the DSI 1 is directly connected with the PNL 1, and the DSI 3 is connected with the PNL 2. A data flow direction to the PNL 1 is as follows. If the instruction of dual-screen display does not include a request for image signal optimization processing, the SoC outputs an unprocessed image signal through either or both of the DSI 1 and the DSI 2, and transmits the signal to the PNL 1 through the channel C, the ASIC chip in the off state, the channel D, and the channel F, so that the PNL 1 can implement display. A data flow direction to the PNL 2 is as follows. To implement display by the PNL 2, the SoC outputs an unprocessed image signal through the DSI 3, and transmits the signal to the PNL 2 through the channel B and the channel H.

In the foregoing process, if the instruction of dual-screen display includes a request for image signal optimization processing corresponding to the PNL 1, the SoC turns on the ASIC chip, outputs the unprocessed image signal through either or both of the DSI 1 and the DSI 2, and transmits the unprocessed image signal to the ASIC chip through the channel C and the channel A. Then the ASIC chip processes the unprocessed image signal, and transmits a processed image signal to the PNL 1 through the channel D and the channel F. In this case, the PNL 1 may perform regular display (a displayed image is not processed by the ASIC chip), and may also perform enhanced and optimized display (a displayed image is enhanced and optimized by the ASIC chip).

The scenario 2 is a scenario in which only the PNL 1 implements display, and the PNL 1 may implement enhanced and optimized image display. Toggle switch control by the SoC and data flow directions are as follows. As shown in FIG. 8, when the SoC receives the instruction of display by the PNL 1, if the instruction includes a request for enhanced and optimized image display, the SoC executes the instruction, and the SoC turns on the ASIC chip, closes the channel G, the channel B, and the channel H, and opens the channel A, the channel C, the channel D, and the channel F, so that the DSI 1 and the DSI 2 are connected with the ASIC chip, and the ASIC chip is connected with the PNL 1. A data flow direction is as follows. The SoC 810 sends the to-be-processed image signals "videoX" and "videoX" to the ASIC chip 820 through the channel C and the channel C respectively. The ASIC chip 820 processes the image signal to obtain a processed image signal. The ASIC chip 820 then sends the processed image signal to the PNL 1 through the channel D and the channel F, so that the PNL 1 can implement enhanced and optimized display of the image signal.

The scenario 3 is a scenario in which only the PNL 2 implements display, and the PNL 2 may implement enhanced and optimized image display. Toggle switch control by the SoC and data flow directions are as follows. As shown in FIG. 8, when the SoC receives an instruction of display by the PNL 2, if the instruction includes a request for enhanced and optimized image display, the SoC executes the instruction, and the SoC turns on the ASIC chip, opens the channel A, the channel C, the channel D, the channel G, and the channel H, and closes the channel F and the channel B, so that the DSI 1 and the DSI 2 are connected with the ASIC chip, and the ASIC chip is connected with the PNL 2. A data flow direction is as follows. The SoC 810 sends an unprocessed image signal to the ASIC chip 820 through the channel A and the channel C. The ASIC chip 820 processes the image signal, obtains a processed image signal, and sends the processed image signal to the PNL 2 through the channel D, the channel G, and the channel H, so that the display PNL 2 can implement enhanced and optimized display of image data.

In addition, in some embodiments, when there are more than two DSIs, a toggle switch may not be needed. For details, refer to Embodiment 5.

Embodiment 6

Figure 9:
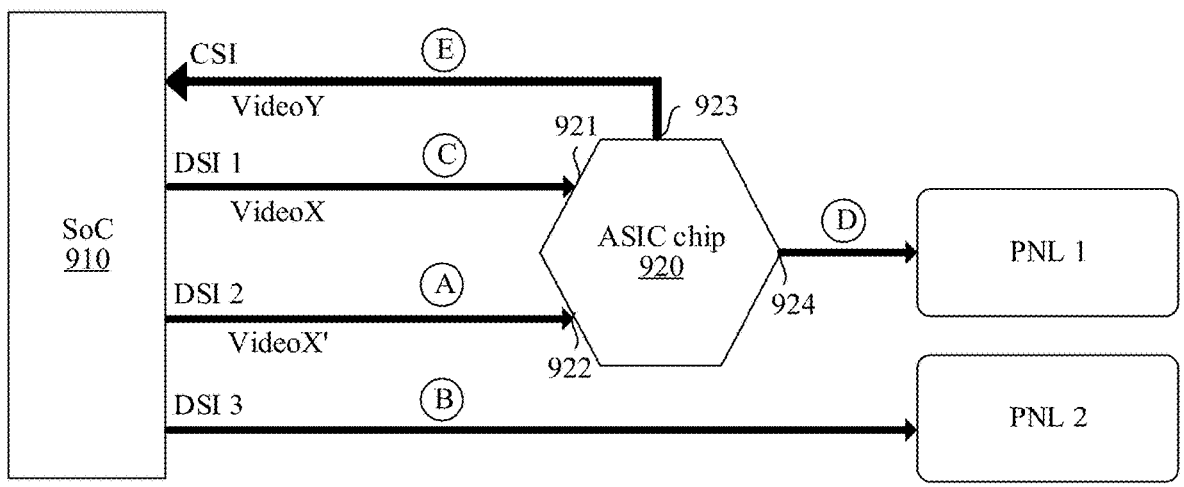
FIG. 9 is a schematic diagram of a structure including three DSIs in a dual-screen mobile phone according to another embodiment of this application.

Refer to FIG. 9. FIG. 9 is a schematic diagram of a structure including three DSIs in a dual-screen mobile phone according to another embodiment of this application. As shown in FIG. 9, the mobile phone includes an SoC 910, an ASIC chip 920, and two displays (such as a PNL 1 and a PNL 2).

As shown in FIG. 9, the SoC includes a camera serial interface CSI and three display serial interfaces, namely, a DSI 1, a DSI 2, and a DSI 3. The ASIC chip 920 includes an input port 921, an input port 922, an output port 923, and an output port 924.

As shown in FIG. 9, the CSI of the SoC is connected with the output port 923 of the ASIC chip 920, and a transmission channel E is formed. The DSI 1 is connected with the input port 921 of the ASIC chip, and a transmission channel C is formed. The DSI 2 is connected with the input port 922 of the ASIC chip, and a transmission channel A is formed. The output port 924 of the ASIC chip is connected with the PNL 1, and a transmission channel D is formed. The DSI 3 is directly connected with the display PNL 2, and a transmission channel B is formed.

The following describes data flows between the channels with reference to the accompanying drawings.

As shown in FIG. 9, the channel E is used to return an image signal obtained through processing by the ASIC chip to the SoC, for example, "videoY". The transmission channel C and the transmission channel A are used by the SoC to output a signal to the ASIC chip, for example, output unprocessed image data "videoX" and "videoX". The signal may be processed by the ASIC chip to obtain a processed image signal like VideoY, and the processed image data may be transmitted to the PNL 1 through the transmission channel D, or may be returned to the SoC through the transmission channel E, and then transmitted to the PNL 2 through the transmission channel B.

With reference to FIG. 9 and Table 6, the following describes implementation of single-screen display and dual-screen display of a mobile phone through controlling, by the SoC, transmission in each channel. Controlling transmission in each channel includes the following cases: a transmission channel sending data or a transmission channel not sending data. The channel not sending data is understood as a closed channel. On the contrary, the channel sending data is understood as an opened channel. Specifically, the following scenarios may be included. Refer to Table 6.

performs controlling to close the channel A and open the channel B, the channel C, and the channel D, so that the DSI 1 and the DSI 2 are directly connected with the PNL 1. If the instruction of dual-screen display does not include a request for image signal optimization processing, a data flow direction to the PNL 1 is as follows. To implement display by the PNL 1, the SoC outputs an unprocessed image signal to the ASIC chip in the off state through at least one of the DSI 1 and the DSI 2, and transmits the signal to the PNL 1 through the ASIC chip. A data flow direction to the PNL 2 is as follows. To implement display by the PNL 2, the SoC outputs an unprocessed image signal through the DSI 3, and transmits the signal to the PNL 2 through the channel B.

In the foregoing process, if an instruction of dual-screen display includes a request for image signal optimization processing on the PNL 1, a data flow direction to the PNL 1 is as follows. The SoC transmits an unprocessed image signal to the ASIC chip in an on state through at least one of the DSI 1 and the DSI 2, and the ASIC chip processes the image signal and transmits a processed image signal to the PNL 1 through the transmission channel D, so that the PNL 1 can implement enhanced and optimized image display.

The scenario 2 is a scenario in which only the PNL 1 performs display, and the PNL 1 may implement enhanced and optimized image display. FIG. 9 shows data flow directions in this scenario. When the SoC receives an instruction of display by the PNL 1, and the instruction includes a request for enhancement and optimization processing, the SoC executes the instruction, turns on the ASIC chip, closes the channel B, and opens the channel A, the channel C, and the channel D, so that the DSI 1 and the DSI 2 are connected with the ASIC chip, and the ASIC chip is connected with the PNL 1. A data flow direction is as follows. The SoC sends to-be-processed image signals to the ASIC chip, for example, "videoX" and "videoX". The ASIC chip processes the image signal to obtain a processed image signal, and sends the processed image signal to the PNL 1 through the channel D, so that the PNL 1 can implement enhanced and optimized display of the image data. In addition, if the instruction does not include the request for enhancement and optimization processing, the SoC may transmit the signal to the ASIC chip in the off state (the ASIC chip does not process the image signal) through at least one of the transmission channel A and the transmission channel C, and the unprocessed image signal is transmitted to the PNL 1 through the channel D, so that the PNL 1 can implement regular display.

The scenario 3 is a scenario in which only the PNL 2 performs display, and the PNL 2 may implement enhanced and optimized image display. FIG. 9 shows data flow

TABLE 6

| Scenario | Solution | Implementation |
|---|---|---|
| Scenario 1 | Dual-screen display | (1) The ASIC chip is on/off. (2) A is closed. (3) B, C, and D are opened. |
| Scenario 2 | PNL 1 + ASIC chip | (1) The ASIC chip is on/off. (2) B is closed. (3) A, C, and D are opened. |
| Scenario 3 | PNL 2 + ASIC chip | (1) The ASIC chip is on/off. (2) A, C, E, and B are opened. (3) D is closed. |

Refer to FIG. 9 and Table 6. The scenario 1 is a dual-screen display scenario, that is, the PNL 1 and the PNL 2 implement display simultaneously. FIG. 9 shows data flow directions in this scenario. When receiving an instruction of dual-screen display, the SoC executes the instruction, and directions in this scenario. When the SoC receives an instruction of display by the PNL 2, and the instruction includes a request for enhancement and optimization processing, the SoC executes the instruction, turns on the ASIC chip, closes the channel D, and opens the channel A, the channel C, the channel B, and the channel E, so that the PNL 2 is connected with the ASIC chip through the SoC. Data flow directions are as follows. The SoC sends to-be-processed image signals to the ASIC chip 920, for example, "videoX" and "videoX". The ASIC chip 920 processes the image signal to obtain a processed image signal like "videoY". The ASIC chip returns the "videoY" to the SoC through the channel E. The SoC sends the processed image signal videoY to the PNL 2, so that the PNL 2 can implement enhanced and optimized display of image data. In addition, if the instruction does not include the request for enhancement and optimization processing, the SoC may transmit the unprocessed image signal to the PNL 2 through the channel B, so that the PNL 2 can implement regular display. The following describes a multi-screen data processing method according to an embodiment of this application. The method may be applied to the structure in any one of the embodiments in FIG. 2 to FIG. 8.

Figure 10:
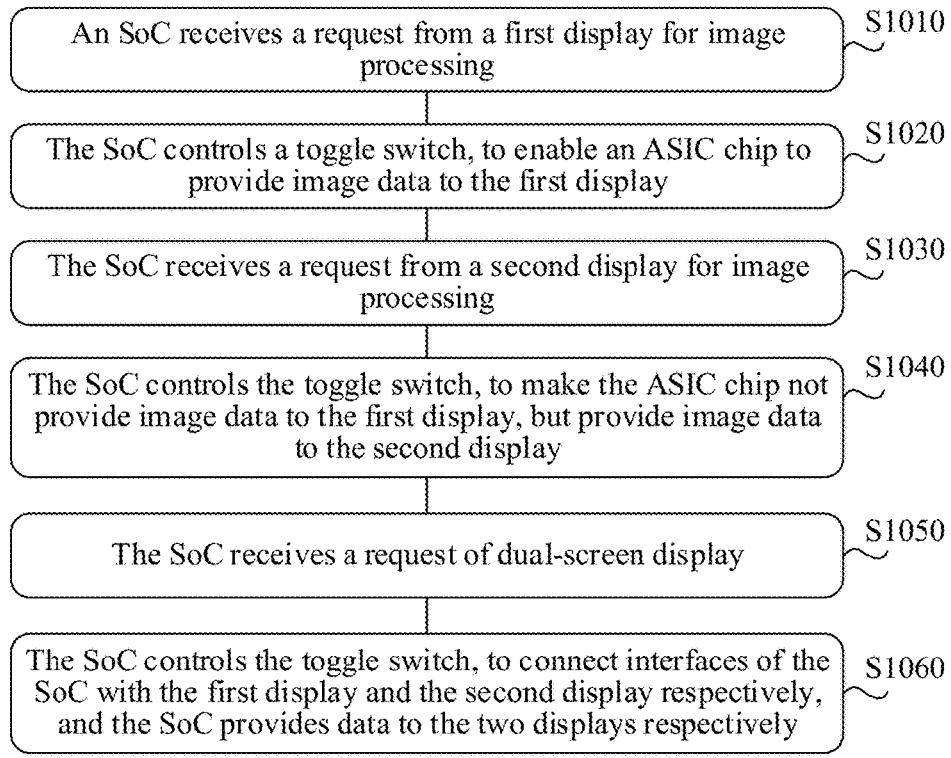
FIG. 10 is a flowchart of a multi-screen data processing method according to another embodiment of this application.

Refer to FIG. 10. FIG. 10 is a flowchart of multi-screen data processing method according to an embodiment of this application. With reference to the scenario shown in FIG. 1b, as shown in FIG. 10, S1010 to S1060 are included. This method is implemented by a mobile phone. For a specific structure, refer to the structures in FIG. 2 to FIG. 8.

- S1010: An SoC receives a request from a first display for image processing. The request for image processing may be an instruction sent by a user in an interface. For example, in a game interface, when the user opens the game interface on the first display, a touch sensor sends an operation event (request) opened by the user to the SoC. The SoC responds to the request and executes the following steps.
- S1020: The SoC controls a toggle switch, to enable an ASIC chip to provide image data to the first display. For a process of controlling the toggle switch by the SoC, refer to the descriptions of the scenarios 2 in FIG. 2 to FIG. 8 in the foregoing embodiments. Details are not repeated herein.
- S1030: The SoC receives a request from a second display for image processing.
- S1040: The SoC controls the toggle switch, to make the ASIC chip not provide image data to the first display, but provide image data to the second display. For a process of controlling the toggle switch by the SoC, refer to the descriptions of the scenarios 3 in FIG. 2 to FIG. 8 in the foregoing embodiments. Details are not repeated herein.

It should be noted that an order of the requests in S1010 and S1030 is not limited. This application only provides example descriptions. In some embodiments, the second display may make the request first, or a request of dual-screen display may be from another module. This is not limited herein.

- S1050: The SoC receives a request of dual-screen display. The request may be sent by tapping two displays by the user, or implemented by using a hardware button or software functional button for dual-screen display function on the mobile phone.
- S1060: The SoC controls the toggle switch, to connect interfaces of the SoC with the first display and the second display respectively, and the SoC provides data to the two displays respectively. For a process of controlling the toggle switch by the SoC, refer to the descriptions of the scenarios 1 in FIG. 2 to FIG. 8 in the foregoing embodiments. Details are not repeated herein.

According to this method, based on whether there is a requirement of a display for enhancement and optimization processing on an image, a corresponding image signal obtained through processing by the ASIC chip is provided, or an unprocessed image signal is provided. In this way, one ASIC chip can correspond to a plurality of displays, and image processing can be automatically selected based on the requirement. This improves user experience.

It should be noted that, in the forgoing embodiments of this application, examples in which there are two displays are used for descriptions. In some embodiments, when there are more than two displays, more displays can implement display by appropriately increasing a quantity of toggle switches and the like. The quantity of toggle switches is not limited in this application. According to the multi-screen data processing method provided in this embodiment of this application, when an electronic device has more than two displays, one ASIC chip can correspond to a plurality of displays without increasing a quantity of ASIC chips, so that the plurality of displays of the electronic device can implement an enhanced and optimized visual effect. This meets user's requirement for low costs and an enhanced display effect on a plurality of screens. In this way, user experience is improved.

Components of the electronic device in this embodiment of this application and a procedure of controlling data flow directions are described in detail in the foregoing embodiment. For details, refer to the multi-screen data processing method described in FIG. 10 in the foregoing embodiment. The details are not repeated herein.

This application further provides an electronic device, including:

- a memory, configured to store instructions executed by one or more processors of the device; and
- a processor, configured to implement the multi-screen data processing method explained in the foregoing embodiment with reference to FIG. 10.

This application further provides a computer-readable storage medium. The computer-readable storage medium stores a computer program. When the computer program is run by a processor, the processor is enabled to implement the multi-screen data processing method explained in the foregoing embodiment with reference to FIG. 10.

This application further provides a computer program product including instructions. When the computer program product is run on an electronic device, a processor is enabled to implement the multi-screen data processing method explained in the foregoing embodiment with reference to FIG. 10.

Figure 11:
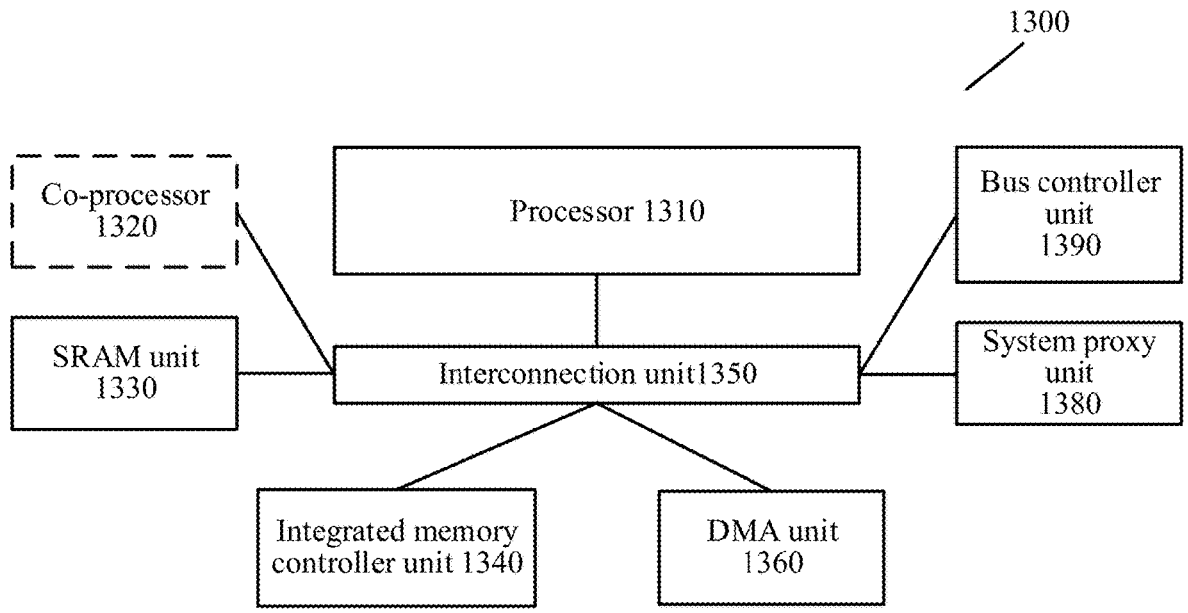
FIG. 11 is a block diagram of a system on chip according to some embodiments of this application.

Refer to FIG. 11. FIG. 11 is a block diagram of an SoC (System on Chip, System on Chip) 1300 according to an embodiment of this application. In FIG. 11, similar components have the same reference numeral. In addition, a dashed box is an optional feature of a more advanced SoC. In FIG. 11, the SoC 1300 includes: an interconnection unit 1350, coupled to an application processor 1310; a system proxy unit 1380; a bus controller unit 1390; an integrated memory controller unit 1340; a set of or one or more co-processors 1320, including integrated graphics logic, an image processor, an audio processor, and a video processor; a static random access memory (Static Random Access Memory, SRAM) unit 1330; and a direct memory access (DMA) unit 1360. In one embodiment, the co-processor 1320 includes a dedicated processor like a network or communication processor, a compression engine, a GPU, a high-throughput MIC processor, or an embedded processor.

The static random access memory (SRAM) unit 1330 may include one or more computer-readable media for storing data and/or instructions. A computer-readable storage medium may store an instruction, to be specific, a temporary copy and a permanent copy of the instruction. The instruction may include an instruction executed by at least one unit in the processor, so that the SoC 1300 can implement the processing method according to the foregoing embodiment. For details, refer to the processing method explained in FIG. 10 in the foregoing embodiment. Details are not repeated here.

Embodiments of the mechanisms disclosed in this application may be implemented in hardware, software, firmware, or a combination of these implementation methods. Embodiments of this application may be implemented as a computer program or program code executed on a programmable system. The programmable system includes at least one processor, a storage system (including volatile and non-volatile memories and/or a storage element), at least one input device, and at least one output device.

The program code may be used for instruction input, to perform the functions described in this application and generate output information. The output information may be applied to one or more output devices in a known manner. For the purpose of this application, the processing system includes any system having a processor like a digital signal processor (Digital Signal Processor, DSP), a micro-controller, an application specific integrated circuit (Application Specific Integrated Circuit, ASIC), or a micro-processor.

The program code can be implemented in high-level programming language or object-oriented programming language to communicate with the processing system. When necessary, an assembly language or machine language may also be used to implement the program code. In fact, the mechanisms described in this application are not limited to the scope of any specific programming language. In any case, the language may be a compiled language or an interpreted language.

In some cases, the disclosed embodiment may be implemented by hardware, firmware, software, or any combination thereof. The disclosed embodiment may also be implemented as an instruction carried or stored on one or more temporary or non-temporary machine-readable (for example, computer-readable) storage media. The instruction can be read and executed by one or more processors. For example, the instruction may be distributed through a network or through another computer-readable media. Therefore, the machine-readable media may include any mechanism configured to store or transmit information in a machine-readable (for example, computer-readable) form, including but not limited to a floppy disk, an optical disk, an optical disc, a compact disc read only memory (Compact Disc Read Only Memory, CD-ROMs), a magneto-optical disks, a read only memory (Read Only Memory, ROM), a random access memory (RAM), an erasable programmable read only memory (Erasable Programmable Read Only Memory, EPROM), an electrically erasable programmable read only memory (Electrically Erasable Programmable Read Only Memory, EPROM), a magnetic card or an optical card, a flash memory, or a tangible machine-readable memory used to transmit information (such as a carrier wave or an infrared signal digital signal) by using the Internet to transmit a signal in an electrical form, an optical form, a sound form, or another form. Accordingly, a machine-readable medium includes any type of machine-readable medium suitable for storing or transmitting electronic instructions or information in a machine-readable (for example, machine-readable) form.

In the accompanying drawings, some structural or methodological features may be shown in a specific arrangement and/or order. However, it should be understood that such specific arrangement and/or order may not be required. In some embodiments, these features may be arranged in a manner and/or order different from the manner and/or order shown in the drawings of the specification. In addition, a structural or methodological feature in a specific diagram does not imply that this feature is required in all embodiments, and in some embodiments, this feature may not be included or may be combined with another feature.

It should be noted that, each unit/module mentioned in each device embodiment of this application is a logical unit/module. Physically, a logical unit/module may be a physical unit/module, or may be a part of a physical unit/module, or may be implemented by combining a plurality of physical units/modules. Physical implementation manners of the logical units/modules are not the most important, but combination of functions realized by these logic units/modules is the key to solving the technical problems raised in this application. In addition, in order to highlight the innovative part of this application, the foregoing device embodiments of this application do not introduce units/modules loosely related to the technical problems raised in this application. This does not mean that there are no other units/modules in the foregoing device embodiments.

It should be noted that, in the examples and specification of this patent, the relational terms such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, a process, a method, an object, or a device that includes a series of elements not only includes such elements, but also includes other elements not specified expressly, or may include inherent elements of the process, the method, the object, or the device. If no more limitations are made, an element limited by "include a/an . . . " does not exclude other same elements existing in the process, the method, the object, or the device which includes the element.

Although this application is illustrated and described by referring to some preferred embodiments of this application, a person skilled in the art should understand that various changes in form and details without departing from the spirit and scope of this application can still be made.

The invention claimed is:
1. An electronic device, comprising: a control chip, a display chip, and a plurality of displays, wherein
the control chip comprises a first display serial interface (DSI) and a second DSI, and the first DSI and the second DSI are connected with input ports of the display chip respectively, and are configured to provide a first data signal to the display chip;
an output port of the display chip is connected with a first display of the plurality of displays, the control chip is configured to control the display chip to output the first data signal or a second data signal to the first display, and the second data signal comprises image data obtained through processing the first data signal by the display chip; and the control chip is configured to control the output port of the display chip to output the first data signal or the second data signal to a second display other than the first display.

2. The electronic device according to claim 1, wherein the output port of the display chip comprises:
   a first chip output port that is connected with the first display and that is configured to output the first data signal or the second data signal to the first display; and
   a second chip output port that is connected with the second display and that is configured to output the first data signal or the second data signal to the second display.

3. The electronic device according to claim 1, wherein the control chip further comprises a camera serial interface (CSI);
   the display chip comprises a third chip output port, wherein the third chip output port is connected with the CSI and is configured to return the second data signal to the control chip; and
   the control chip is connected with the second display and is configured to output the first data signal or the second data signal to the second display.

4. The electronic device according to claim 3, wherein the control chip further comprises:
   a third DSI that is connected with the second display and that is configured to output the first data signal or the second data signal to the second display.

5. The electronic device according to claim 3, wherein the electronic device further comprises:
   a first toggle switch, comprising an input port connected with the second DSI, a first output port connected with the display chip, and a second output port connected with the second display; and
   the control chip controls the first toggle switch to switch between a signal transmission channel for the second DSI and the display chip and a signal transmission channel for the second DSI and the second display.

6. The electronic device according to claim 1, wherein the electronic device comprises a second toggle switch, a third toggle switch, and a fourth toggle switch;
   the second toggle switch comprises an input port connected with the second DSI, a first output port connected with the display chip, and a second output port connected with the fourth toggle switch; and the third toggle switch comprises an input port connected with the output port of the display chip, a first output port connected with the third toggle switch, and a second output port connected with the first display; and
   the fourth toggle switch comprises a first input port connected with the second toggle switch and a second input port connected with the third toggle switch, wherein an output port of the third toggle switch is connected with the second display.

7. The electronic device according to claim 6, wherein the second toggle switch, the third toggle switch, and the fourth toggle switch are independent switches, or are integrated into an integrated switch.

8. The electronic device according to claim 1, further comprising: a fifth toggle switch, a sixth toggle switch, a seventh toggle switch, and an eighth toggle switch that are set inside the display chip;
   the display chip comprises a data processing unit, wherein the data processing unit is configured to implement optimization processing on the first data signal, to obtain the second data signal;
   an input port of the fifth toggle switch is connected with the first DSI, a first output port is connected with a first input port of the data processing unit in the display chip, and a second output port of the fifth toggle switch is connected with a first input port of the sixth toggle switch;
   a second input port of the sixth toggle switch is connected with a first output port of the data processing unit, and an output port is connected with the first display;
   an input port of the seventh toggle switch is connected with the second DSI, a first output port is connected with a second input port of the data processing unit, and a second output port is connected with a first input port of the eighth toggle switch; and
   a second input port of the eighth toggle switch is connected with a second output port of the data processing unit, and an output port is connected with the second display.

9. The electronic device according to claim 1, further comprising:
   a ninth toggle switch, wherein an input port of the ninth toggle switch is connected with the input port of the display chip, a first output port is connected with the first display, and a second output port is connected with the second display.

10. The electronic device according to claim 9, further comprising:
    a tenth toggle switch, wherein a first input port of the tenth toggle switch is connected with the second output port of the ninth toggle switch, and an output port is connected with the second display, so that the second output port of the ninth toggle switch is connected with the second display; and
    the display chip further comprises a fourth DSI, wherein the fourth DSI is connected with a second input port of the tenth toggle switch, to connect the control chip with the second display.

11. A multi-screen data processing method, wherein the method is applied to an electronic device, the electronic device comprises: a control chip, a display chip, and a plurality of displays, and the method comprises:
    when the control chip obtains a first request from a first display of the plurality of the displays, and the first request comprises a request for image data processing,
    determining, by the control chip, that there is at least one first transmission channel, and sending the first request and a first data signal to the display chip, wherein the first data signal is unprocessed original image data;
    processing, by the display chip, the first data signal based on the first request, to obtain a second data signal, wherein the second data signal is configured to represent image data obtained through processing the first data signal by the display chip; and
    controlling, by the control chip, the display chip to transmit the second data signal to the first display through a second transmission channel.

12. The processing method according to claim 11, further comprising: when the control chip obtains the first request from the first display of the plurality of the displays and the first request does not comprise the request for image data processing,
    determining, by the control chip, that there is at least one first transmission channel, and sending the first request and the first data signal to the display chip; and controlling, by the control chip, the display chip not to process the first data signal, and to transmit the first data signal to the first display through the second transmission channel.

13. The processing method according to claim 11, further comprising:
when the control chip obtains a second request from a second display, and the second display is a display other than the first display, and the second request comprises a second request for image data processing,
determining, by the control chip, that there is at least one first transmission channel, and sending the second request and a third data signal to the display chip through the at least one first transmission channel, wherein the third data signal is unprocessed image data;
processing, by the display chip, the third data signal based on the second request, to obtain a fourth data signal, wherein the fourth data signal is configured to represent image data obtained through processing the third data signal by the display chip; and
controlling, by the control chip, the display chip to output the fourth data signal to the second display through a third transmission channel.

14. The processing method according to claim 13, wherein the control chip comprises a first display serial interface (DSI); and
the determining, by the control chip, that there is at least one first transmission channel comprises:
controlling, by the control chip, connection between the first DSI and a first input port of the display chip, to establish a first DSI transmission channel, and sending the second request and the third data signal to the display chip through the first DSI transmission channel.

15. The processing method according to claim 14, wherein the control chip further comprises a first camera serial interface (CSI) and a third DSI, and the first CSI is connected with an output port of the display chip to form a first CSI transmission channel; and
the controlling, by the control chip, the display chip to output the fourth data signal to the second display through the third transmission channel comprises:
controlling, by the control chip, connection between the third DSI and the second display, to establish a third DSI transmission channel; and
returning, by the display chip, the fourth data signal to the control chip through the first CSI transmission channel, and outputting, by the control chip, the fourth data signal to the second display through the third DSI transmission channel.

16. The processing method according to claim 14, wherein the control chip further comprises a second DSI; and
the determining, by the control chip, that there is at least one first transmission channel further comprises:
controlling, by the control chip, connection between the second DSI and a second input port of the display chip, to establish a second DSI transmission channel, and sending the second request and the third data signal to the display chip through the first DSI transmission channel and the second DSI transmission channel.

17. The processing method according to claim 16, wherein the control chip further comprises a second CSI and a fourth DSI, wherein the second CSI is connected with an output port of the display chip to form a second CSI transmission channel, and the fourth DSI is connected with the second display to form a fourth DSI transmission channel; and
the controlling, by the control chip, the display chip to output the fourth data signal to the second display through the third transmission channel comprises:
returning, by the display chip, the fourth data signal to the control chip through the second CSI transmission channel, and outputting, by the control chip, the fourth data signal to the second display through the fourth DSI transmission channel.

18. The processing method according to claim 13, further comprising: when the control chip obtains the second request from the second display, and the second display is a display other than the first display, and the second request does not comprise the second request for image data processing,
determining, by the control chip, that there is at least one first transmission channel, and sending the second request and the third data signal to the display chip; and
controlling, by the control chip, the display chip not to process the third data signal, but to transmit the fourth data signal to the second display through the third transmission channel, wherein the third transmission channel is a transmission channel formed by connecting an output port of the display chip with the second display.

19. The processing method according to claim 13, further comprising: when the control chip obtains the second request from the second display, and the second display is a display other than the first display, and the second request does not comprise the second request for image data processing,
the control chip establishes a fourth transmission channel with the second display, and sends the third data signal to the second display through the fourth transmission channel.

20. An electronic device, comprising:
a control chip, a display chip, a plurality of displays, and a memory, wherein the memory is configured to store instructions executed by one or more processors of the electronic device; and when the control chip is configured to execute the instructions, the electronic device is enabled to perform a processing method, the method comprising:
when the control chip obtains a first request from a first display of the plurality of the displays, and the first request comprises a request for image data processing,
determining, by the control chip, that there is at least one first transmission channel, and sending the first request and a first data signal to the display chip, wherein the first data signal is unprocessed original image data; and
processing, by the display chip, the first data signal based on the first request, to obtain a second data signal, wherein the second data signal is configured to represent image data obtained through processing the first data signal by the display chip; and
controlling, by the control chip, the display chip to transmit the second data signal to the first display through a second transmission channel.

* * * * *